US012333977B2

(12) United States Patent
Zhang et al.

(10) Patent No.: US 12,333,977 B2
(45) **Date of Patent: *Jun. 17, 2025**

(54) DISPLAY PANEL AND DEVICE WITH BIAS MAINTAINING STAGE DURATION ACCORDING TO BRIGHTNESS

(71) Applicant: Xiamen Tianma Display Technology Co., Ltd., Xiamen (CN)

(72) Inventors: Yuheng Zhang, Xiamen (CN); Jiemiao Pan, Xiamen (CN); Xiangyuan Li, Xiamen (CN); Jinjin Yang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,279

(22) Filed: Nov. 14, 2023

(65) Prior Publication Data

US 2024/0078948 A1 Mar. 7, 2024

(30) Foreign Application Priority Data

Jul. 3, 2023 (CN) ......................... 202310806330.9

(51) Int. Cl.
*G09G 3/20* (2006.01)

(52) U.S. Cl.
CPC ....... *G09G 3/20* (2013.01); *G09G 2300/0819* (2013.01); *G09G 2300/0842* (2013.01); *G09G 2310/08* (2013.01); *G09G 2320/0233* (2013.01); *G09G 2320/0252* (2013.01); *G09G 2320/045* (2013.01); *G09G 2320/0626* (2013.01); *G09G 2330/021* (2013.01)

(58) Field of Classification Search
CPC ................... G09G 3/20; G09G 3/3233; G09G 2300/0819; G09G 2300/0842; G09G 2300/0861; G09G 2310/0251; G09G 2310/0262; G09G 2320/0233; G09G 2320/045; G09G 2320/0656
See application file for complete search history.

(56) References Cited

U.S. PATENT DOCUMENTS

| | | | | |
|---|---|---|---|---|
| 11,468,814 B1 * | 10/2022 | Zhang | ...................... | G09G 3/20 |
| 2022/0335872 A1 * | 10/2022 | Zhang | ...................... | G09G 3/20 |
| 2024/0046832 A1 * | 2/2024 | Pan | .......................... | G09G 3/20 |

* cited by examiner

*Primary Examiner* — Liliana Cerullo
(74) *Attorney, Agent, or Firm* — KDW Firm PLLC

(57) ABSTRACT

A display panel includes a pixel circuit and a light-emitting element. The working process of the pixel circuit includes a data write stage and a bias stage. The working process of the pixel circuit includes a first light emission stage and a first non-light emission stage. In the first non-light emission stage, a bias maintaining stage is from the start moment of the bias stage to the start moment of the first light emission stage. Working modes of the display panel include a first mode and a second mode. The display brightness of the display panel in the first mode is different from the display brightness of the display panel in the second mode. The length of the bias maintaining stage in the first mode is different from the length of the bias maintaining stage in the second mode.

20 Claims, 16 Drawing Sheets

DISPLAY PANEL AND DEVICE WITH BIAS MAINTAINING STAGE DURATION ACCORDING TO BRIGHTNESS

CROSS-REFERENCE TO RELATED APPLICATION(S)

This application claims the priority of Chinese Patent Application No. 202310806330.9, filed on Jul. 3, 2023, the disclosure of which is incorporated herein by reference in its entirety.

TECHNICAL FIELD

The present disclosure relates to the field of display panel technology and, in particular, to a display panel and a display device.

BACKGROUND

Pixel circuits and light-emitting elements are usually disposed in a display panel. A drive transistor in a pixel circuit can supply a drive current to a light-emitting element according to a data signal received by the drive transistor to drive the light-emitting element to emit light, enabling the display panel to present a corresponding display image.

However, over time, features inside the drive transistor in the pixel circuit change slowly, leading to a threshold voltage drift of the drive transistor. Moreover, threshold drift conditions of the drive transistor differ in different display brightness, thereby affecting the display uniformity of the display panel.

SUMMARY

The present disclosure provides a display panel and a display device.

According to one aspect of the present disclosure, a display panel is provided. The display panel includes a pixel circuit and a light-emitting element.

A pixel circuit among the pixel circuits includes a drive module and a data write module. The drive module includes a drive transistor.

A working process of the pixel circuit includes a data write stage and a bias stage. The data write module is configured to supply a data signal in the data write stage. The data write module is configured to supply a bias signal in the bias stage.

The drive transistor is configured to selectively supply a drive current to the light-emitting element. The working process of the pixel circuit includes a first light emission stage and a first non-light emission stage.

In the first non-light emission stage, a bias maintaining stage is from a start moment of the bias stage to a start moment of the first light emission stage.

Working modes of the display panel include a first mode and a second mode. Display brightness of the display panel in the first mode is different from display brightness of the display panel in the second mode.

A length of the bias maintaining stage in the first mode is different from a length of the bias maintaining stage in the second mode.

In a second aspect, an embodiment of the present disclosure provides a display device.

The display device includes the display panel described in the first aspect.

BRIEF DESCRIPTION OF DRAWINGS

To illustrate technical solutions in embodiments of the present disclosure more clearly, drawings used in the description of the embodiments are briefly described below. Apparently, the drawings described below only illustrate part of embodiments of the present disclosure, and those of ordinary skill in the art may obtain other drawings based on the drawings on the premise that no creative work is done.

DETAILED DESCRIPTION

Figure 1:
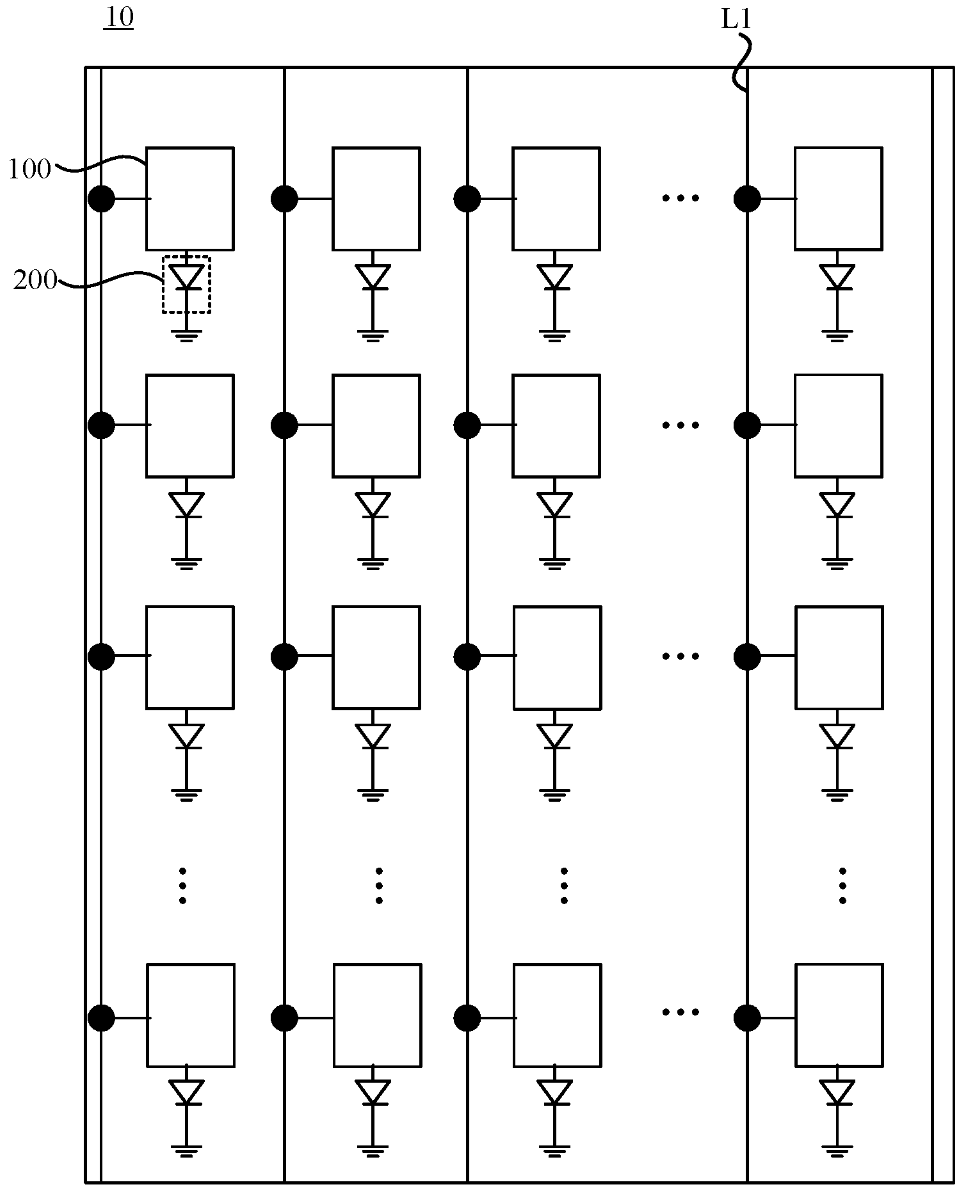
FIG. 1 is a diagram illustrating the structure of a display panel according to an embodiment of the present disclosure.

Technical solutions in embodiments of the present disclosure are described clearly and completely in conjunction with drawings in embodiments of the present disclosure from which technical solutions of the present disclosure are better understood by those skilled in the art. Apparently, the embodiments described below are part, not all, of embodiments of the present disclosure. Based on embodiments of the present disclosure, all other embodiments obtained by those of ordinary skill in the art on the premise that no creative work is done are within the scope of the present disclosure.

It is to be noted that terms such as "first" and "second" in the description, claims and drawings of the present disclosure are used for distinguishing between similar objects and are not necessarily used for describing a particular order or sequence. It is to be understood that the data used in this manner are interchangeable in appropriate cases so that embodiments of the present disclosure described herein can be implemented in an order not illustrated or described herein. In addition, terms "comprising", "including" and any other variations thereof are intended to encompass a non-exclusive inclusion. For example, a system, product or device that includes a series of units not only includes the expressly listed steps or units but may also include other units that are not expressly listed or are inherent to such a product or device.

The self-luminous display panel includes pixel circuits and light-emitting elements. A pixel circuit includes a drive transistor. A data signal is supplied to a gate of the drive transistor so that the drive transistor converts the data signal into a drive current to drive a light-emitting element to emit light. However, when the drive transistor is turned on, for a PMOS-type transistor, the potential of the gate of the drive transistor may be higher than the potential of a drain of the drive transistor. For an NMOS-type transistor, the potential of the gate of the drive transistor may be lower than the potential of the drain of the drive transistor. When the drive transistor stays in this state for a long time, ions in the drive transistor are polarized. Thus a built-in electric field is formed in the drive transistor, leading to a constant drift of the threshold voltage of the drive transistor, causing a bias of the drive transistor, thereby affecting the stability of the drive current supplied by the drive transistor, and thus affecting the light emission stability of the light-emitting element.

Additionally, when the display panel presents different display brightness, different data signals are supplied to the drive transistor. Alternatively, the light-emitting element has different light emission durations, causing different bias conditions of the drive transistor. That is, the drive transistor has different threshold voltage drift conditions, thereby affecting the display uniformity of the display panel in different display brightness and thus affecting the display effect of the display panel.

To solve the preceding technical solution, in embodiments of the present disclosure, a bias maintaining stage is provided with different durations in different modes, resulting in different durations in which a bias adjustment signal is maintained in a source and/or drain of the drive transistor. Therefore, the bias state of the drive transistor in each mode is adjusted pertinently, thereby guaranteeing the display uniformity in different modes and improving the display effect of the display panel.

Technical solutions in embodiments of the present disclosure are described clearly and completely hereinafter in conjunction with the drawings in embodiments of the present disclosure.

Figure 2:
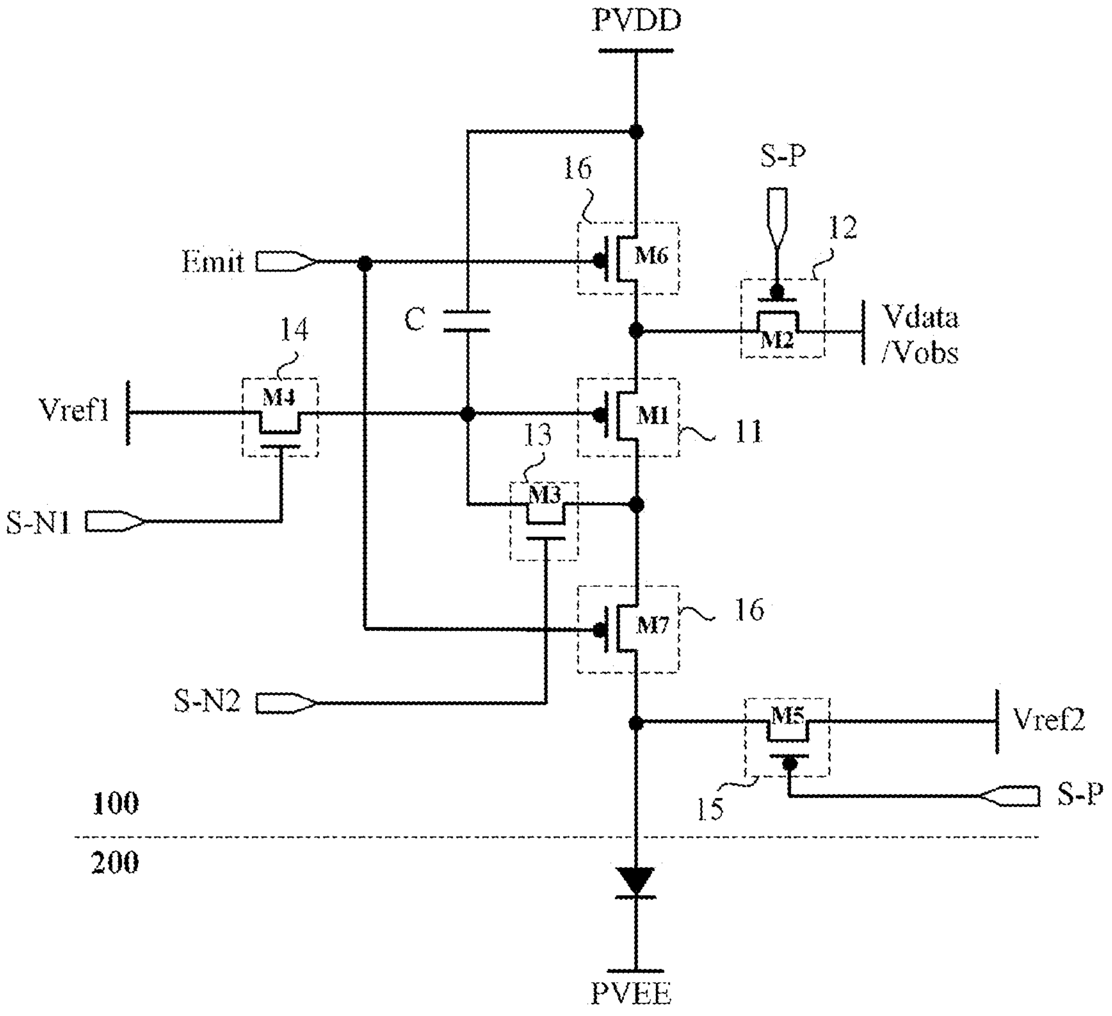
FIG. 2 is a diagram illustrating the structure of a pixel circuit in a display panel according to an embodiment of the present disclosure.
Figure 3:
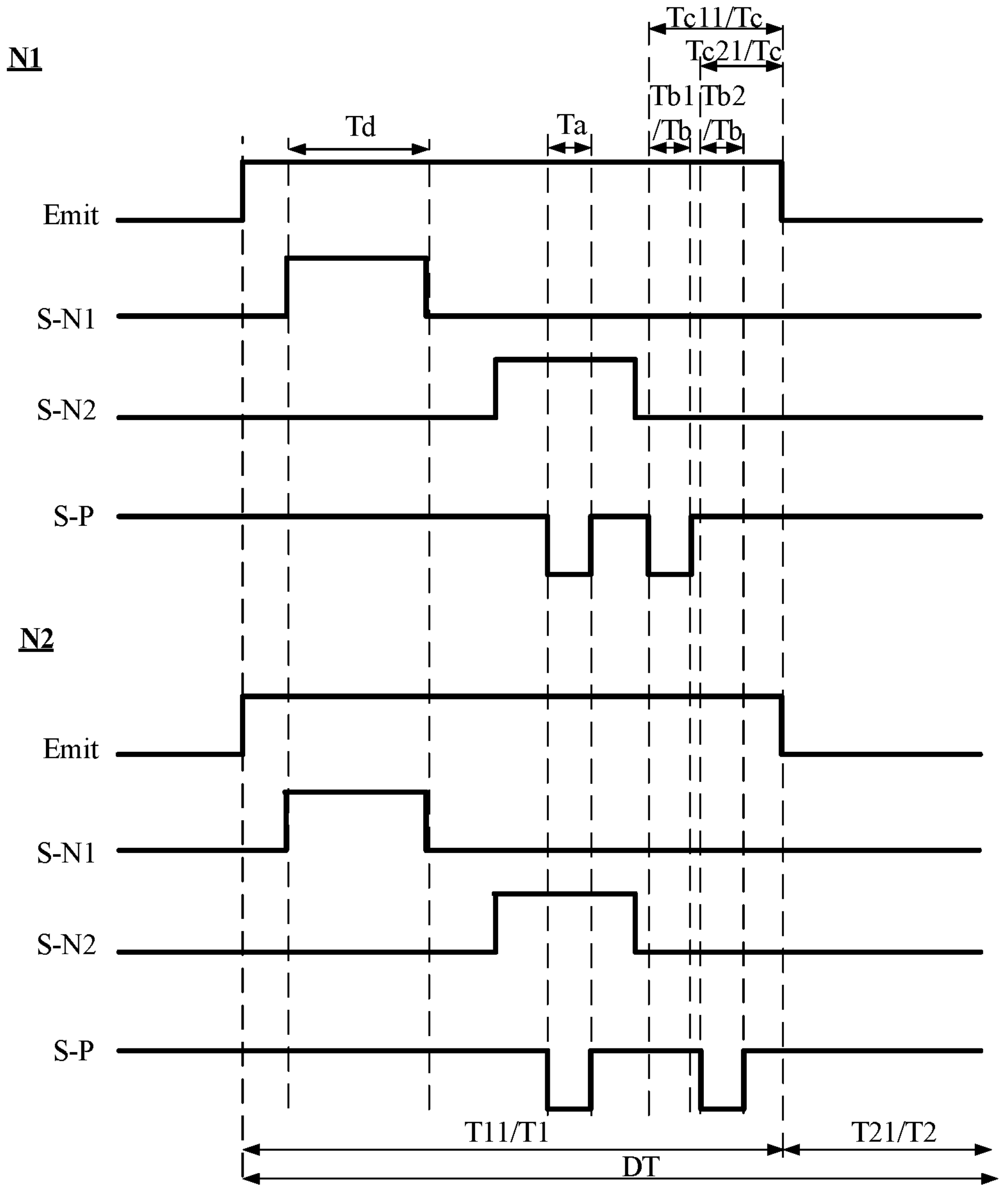
FIG. 3 is a drive timing diagram of a pixel circuit in a display panel according to an embodiment of the present disclosure.

FIG. 1 is a diagram illustrating the structure of a display panel according to an embodiment of the present disclosure. FIG. 2 is a diagram illustrating the structure of a pixel circuit in a display panel according to an embodiment of the present disclosure. FIG. 3 is a drive timing diagram of a pixel circuit in a display panel according to an embodiment of the present disclosure. Referring to FIGS. 1 to 3, the display panel 10 includes pixel circuits 100 and light-emitting elements 200. A pixel circuit 100 includes a drive module 11 and a data write module 12. The drive module 11 includes a drive transistor M1. The drive module 11 is configured to selectively supply a drive current to a light-emitting element 200. The working process of the pixel circuit 100 includes a data write stage Ta and a bias stage Tb. The data write module 12 supplies a data signal Vdata in the data write stage Ta. The data write module 12 supplies a bias signal Vobs in the bias stage Tb.

The working process of the pixel circuit 100 includes a first light emission stage T21 and a first non-light emission stage T11. The first light emission stage T21 may be located after the first non-light emission stage T11. Moreover, the first light emission stage T21 and the first non-light emission stage T11 are two successive stages in time. The first non-light emission stage T11 may include at least the bias stage Tb. In the first non-light emission stage T11, a bias maintaining stage Tc is from the start moment of the bias stage Tb to the start moment of the first light emission stage T21. When working modes of the display panel 10 include a first mode N1 and a second mode N2, and when the display brightness of the display panel 10 in the first mode N1 is different from the display brightness of the display panel 10 in the second mode N2, the length of the bias maintaining stage Tell in the first mode N1 is different from the length of the bias maintaining stage Tc21 in the second mode N2.

It is to be understood that the display panel 10 may include the pixel circuits 100 arranged in an array and the light-emitting elements 200 electrically connected to the pixel circuits 100 correspondingly. Data signals are supplied to the pixel circuits 100. In this case, the drive module 11 in the pixel circuit 100 may supply the drive current to the light-emitting element 200 in a light emission stage T2 to drive the light-emitting element 200 to emit light for display so that the display panel 10 can present a display image with corresponding brightness.

The light-emitting element 200 is usually a current-type drive element. The data signal received by the pixel circuit 100 is usually a voltage signal. Therefore, the drive transistor M1 is disposed in the drive module 11 so that the data signal received by the pixel circuit 100 can be written to a gate of the drive transistor M1. Moreover, a positive power signal PVDD is supplied to a source of the drive transistor M1 or a drain of the drive transistor M1 so that the drive transistor M1 generates the corresponding drive current according to a threshold voltage of the drive transistor M1 and a voltage difference between the potential of the gate of the drive transistor M1 and the positive power signal PVDD, supplies the drive current to the light-emitting element 200, and drives the light-emitting element 200 to emit light with corresponding brightness. In this case, one of the source of the drive transistor M1 or the drain of the drive transistor M1 is coupled to a positive power signal terminal, and the other one of the source of the drive transistor M1 or the drain of the drive transistor M1 is coupled to an anode of the light-emitting element 200. A cathode of the light-emitting element 200 may be electrically connected to a negative power signal terminal. With this arrangement, a current path is formed due to a voltage difference between the positive power signal PVDD of the positive power signal terminal and a negative power signal PVEE of the negative power signal terminal. Therefore, in a light emission stage T2, the drive transistor M1 can generate the drive current and supply the drive current to the light-emitting element 200 to drive the light-emitting element 200 to emit light.

It is to be understood that an active layer material of the drive transistor M1 in the drive module 11 may include a low-temperature polysilicon material so that the drive transistor M1 has relatively high carrier mobility, thereby meeting the requirements such as a high reaction speed and low power consumption. In this case, the drive transistor M1 may be a PMOS-type transistor. In other optional embodiments, the active layer material of the drive transistor M1 may also include an oxide semiconductor material. In this case, the drive transistor M1 may be an NMOS-type transistor. On the premise that the core disclosure points of embodiments of the present disclosure can be implemented, the material and type of the drive transistor M1 are not specifically limited in embodiments of the present disclosure.

It is to be noted that the source of the transistor and the drain of the transistor are not constant but vary with the state of the transistor. FIG. 2 only exemplarily illustrates the case where the drive transistor M1 is a PMOS-type transistor. In this case, the drain of the drive transistor M1 is coupled to the light-emitting element 200. For the PMOS-type drive transistor M1, the drive current I generated by the drive transistor M1 is positively correlated with k $(PVDD-Vdata)^2$. The positive power signal PVDD is usually a fixed value. When the PVDD is constantly greater than the Vdata, the smaller the Vdata, the greater the drive current I and the greater the display brightness of the light-emitting element 200.

For ease of description, without special limitation, an example in which the drive transistor is a PPMOS-type transistor is taken for exemplarily describing technical solutions in embodiments of the present disclosure.

Referring to FIGS. 2 and 3, the pixel circuit may further include the data write module 12. In the data write stage Ta, the data write module 12 supplies the data signal Vdata to the drive module 11, and the data signal Vdata is written to the gate of the drive transistor M1. In this case, the data write module 12 may be directly electrically connected to the gate of the drive transistor M1. Alternatively, the data write module 12 may be indirectly electrically connected to the gate of the drive transistor M1.

In an optional embodiment, a control terminal of the data write module 12 receives a scan signal S-P. An input terminal of the data write module 12 may receive the data signal in the data write stage Ta. An output terminal of the data write module 12 may be electrically connected to the source of the drive transistor M1. In this case, in the data write stage Ta, the scan signal S-P controls the data write module 12 to be turned on so that the data signal Vdata can be transmitted through the data write module 12 to the source of the drive transistor M1 and then through the source of the drive transistor M1 and the drain of the drive transistor M1 successively to the gate of the drive transistor M1. With this arrangement, the data signal Vdata is written, and the threshold voltage Vth of the drive transistor M1 is compensated to the gate of the drive transistor M1 so that the drive transistor M1 generates the drive current according to the voltage of the gate of the drive transistor M1. The drive current may be unrelated to the threshold voltage Vth of the drive transistor M1, preventing a threshold voltage drift of the drive transistor M1 from affecting the magnitude of the generated drive current I and further affecting the brightness of the light-emitting element 200.

Optionally, when the data write module 12 is electrically connected to the source of the drive transistor M1, the pixel circuit 100 may further include a compensation module 13. The compensation module 13 is electrically connected between the drain of the drive transistor M1 and the gate of the drive transistor M1. The compensation module 13 may be turned on or off in the control of a scan signal S-N2. At least in the data write stage Ta, the scan signal S-N2 may control the compensation module 13 to turn on so that a path is formed between the drain of the drive transistor M1 and the gate of the drive transistor M1. The data signal Vdata may be written to the gate of the drive transistor M1 through the data write module 12, the drive transistor M1, and the compensation module 13 successively. Moreover, the threshold voltage of the drive transistor M1 is compensated to the gate of the drive transistor M1.

In an exemplary embodiment, the compensation module 13 may include a compensation transistor M3. A gate of the compensation transistor M3 receives the scan signal S-N2. A first electrode of the compensation transistor M3 is electrically connected to the drain of the drive transistor M1. A second electrode of the compensation transistor M3 is electrically connected to the source of the drive transistor M1. With this arrangement, the scan signal S-N2 may control the compensation transistor M3 to turn on at least in the data write stage Ta.

Correspondingly, the data write module 12 may also supply the bias signal Vobs to the drive module 11 in the bias stage Tb. Because the data write module 12 is electrically connected to the source of the drive transistor M1, the data write module 12 supplies the bias signal Vobs to the source of the drive transistor M1 in the bias stage Tb. Moreover, when the drive transistor M1 is in the on state in the bias stage Tb, the bias signal Vobs may also be transmitted to the drain of the drive transistor M1. Additionally, in the bias stage Tb, the compensation module 13 may also be controlled through the scan signal S-N2 to be in the off state so that the bias signal Vobs cannot be transmitted to the gate of the drive transistor M1, preventing the bias signal Vobs from affecting the voltage written to the gate of the drive transistor M1 and guaranteeing the accuracy of the drive current generated by the drive transistor M1 in the light emission stage T2.

It is to be understood that when the drive transistor M1 receives different data signals Vdata, the drive transistor M1 generates different drive currents, enabling the light-emitting element 200 to have different brightness. Conversely, when the light-emitting element 200 needs to present different brightness, different data signals are supplied to the gate of the drive transistor M1. In this case, if the voltage of the source/drain of the drive transistor M1 is a fixed value, different voltage differences exist between the gate of the drive transistor M1 and the source/drain of the drive transistor N1, thereby enabling the drive transistor M1 to be in different bias states.

It is also to be understood that the display panel 10 may have different working modes in different application scenarios and may present different display brightness in different working modes. For example, in a relatively bright environment, an image displayed by the display panel 10 is usually controlled to have relatively high display brightness so as to make the image presented by the display panel 10 get recognized by human eyes. In a relatively dark environment, the image displayed by the display panel 10 is usually controlled to have relatively low display brightness so as to prevent human eyes from being damaged by the relatively high display brightness of the image presented by the display panel 10. The display panel 10 may have different display brightness in different working modes by adjusting the relationship between grayscales (that is, brightness levels of the light-emitting element 200) and data signals.

Illustratively, when the working modes of the display panel 10 include the first mode N1 and the second mode N2, when the display brightness of the display panel 10 in the first mode N1 is different from the display brightness of the display panel 10 in the second mode N2, and when the display panel 10 presents the same image in the first mode N1 and the second mode N2, for the same light-emitting element 200, a brightness level presented in the first mode N1 is the same as a brightness level presented in the second mode N2. However, data signals Vdata received by the pixel circuit 100 for driving the light-emitting element 200 have different voltages. For example, the voltage of a data signal Vdata supplied to the gate of the drive transistor M1 for driving the light-emitting element 200 in the first mode N1 is V1. The voltage of a data signal Vdata supplied to the gate of the drive transistor M1 for driving the light-emitting element 200 in the second mode N2 is V2. V1≠V2. In this case, if the voltage of the source/drain of the drive transistor M1 is Vs/d, then a voltage difference between the gate of the drive transistor M1 and the source/drain of the drive transistor M1 in the first mode is V1 −Vs/d, and a voltage difference between the gate of the drive transistor M1 and the source/drain of the drive transistor M1 in the second mode is V2−Vs/d. In this case, after the data write stage in the first mode and in the second mode, different voltage differences between the gate of the drive transistor M1 and the source/drain of the drive transistor M1 exist, causing the drive transistor M1 to have different bias states after the data write stage in the first mode and in the second mode, leading to different threshold drifts of the drive transistor M1, and thereby affecting a drive current supplied by the drive transistor M1 in the subsequent light emission stage T2.

Accordingly, after the data write stage Ta, one bias stage Tb may be provided so that the data write module 12 supplies the bias signal Vobs to the source/drain of the drive transistor M1 in the bias stage Tb to perform a bias adjustment for the drive transistor M1. Moreover, after the bias signal Vobs is supplied to the source/drain of the drive transistor M1, if no new signal is written to the source/drain of the drive transistor M1, the bias signal Vobs may be continuously maintained in the source/drain of the drive transistor M1. The bias maintaining stage Tc is a time period from the start moment of the bias stage Tb to the start moment of the first light emission stage T21. After the bias stage Tb and before the light emission stage T2, no new signal is written to the source/drain of the drive transistor M1. Therefore, the bias signal Vobs may be continuously maintained in the source/drain of the drive transistor M1 in the bias maintaining stage Tc so that the voltage difference between the gate of the drive transistor M1 and the source/drain of the drive transistor M1 may be continuously maintained as the voltage difference between the data signal Vdata and the bias signal Vobs, making the drive transistor M1 stay in a corresponding bias state.

Additionally, a bias of the drive transistor M1 is caused by the ion polarization in the drive transistor M1 so that the bias condition of the drive transistor M1 varies with time. In this case, the duration of the bias maintaining stage Tc11 in the first mode N1 and the duration of the bias maintaining stage Tc21 in the second mode N2 are set to different values so that the bias generated by different durations of the bias maintaining stage Tc can be partially or completely counteracted by the bias generated by different data signals. Therefore, when entering the first light emission stage T21 in different modes, the drive transistor M1 can maintain a consistent bias condition, thereby helping improve the display uniformity of the display panel in different modes and thus helping improve the display effect of the display panel 10.

It is to be understood that the duration of the bias maintaining stage in the first mode is set to be different from the duration of the bias maintaining stage in the second mode so that the bias caused by different data signals is balanced. On the premise that the bias caused by different data signals is balanced, the display brightness of the display panel in the first mode, the display brightness of the display panel in the second mode, the duration of the bias maintaining stage in the first mode, and the duration of the bias maintaining stage in the second mode are not specifically limited in embodiments of the present disclosure. For example, in an embodiment, the duration of the bias maintaining stage in the first mode is greater than the duration of the bias maintaining stage in the second mode. In another embodiment, the duration of the bias maintaining stage in the first mode is less than the duration of the bias maintaining stage in the second mode.

In an optional embodiment, with continued reference to FIGS. 1 to 3, when the display brightness of the display panel 10 in the first mode N1 is greater than the display brightness of the display panel 10 in the second mode N2, the length of the bias maintaining stage Tc11 in the first mode N1 is t10, and the length of the bias maintaining stage Tc21 in the second mode N2 is t20. In this case, t10>t20. That is, the voltage difference between the gate of the drive transistor M1 and the source/drain of the drive transistor M1 is maintained as the voltage difference between the data signal and the bias signal for a relatively long time in the first mode. The voltage difference between the gate of the drive transistor M1 and the source/drain of the drive transistor M1 is maintained as the voltage difference between the data signal and the bias signal for a relatively short time in the second mode.

Specifically, by way of example, the drive transistor M1 is a PMOS-type transistor. In the case where the brightness levels of the light-emitting element 200 are all Q, the voltage V1 of the data signal Vdata in the first mode N1 is smaller than the voltage V2 of the data signal Vdata in the second mode N1. Accordingly, the voltage difference between the gate of the drive transistor M1 and the source/drain of the drive transistor M1 in the bias maintaining stage Tc11 in the first mode N1 is V1−Vobs, and the voltage difference between the gate of the drive transistor M1 and the source/drain of the drive transistor M1 in the bias maintaining stage Tc21 in the second mode N2 is V2−Vobs. V1−Vobs is smaller than V2−Vobs. Accordingly, the ion polarity in the drive transistor M1 is to a relatively small degree due to the voltage difference between the gate of the drive transistor M1 and the source/drain of the drive transistor M1 in the first mode N1. The ion polarity in the drive transistor M1 is to a relatively large degree due to the voltage difference between the gate of the drive transistor M1 and the source/drain of the drive transistor M1 in the second mode N2. In this case, the length of the bias maintaining stage Tc11 in the first mode N1 is relatively great so that the difference between the gate of the drive transistor M1 and the source/drain of the drive transistor M1 is maintained as V1−Vobs for a relatively long time. The length of the bias maintaining stage Tc21 in the second mode N2 is relatively small so that the difference between the gate of the drive transistor M1 and the source/drain of the drive transistor M1 is maintained as V2−Vobs for a relatively short time. Accordingly, the bias of the drive transistor M1 to different degrees due to different voltage differences between the gate of the drive transistor M1 and the source/drain of the drive transistor M1 in the first mode and the second mode is balanced. Therefore, when entering the first light emission stage T21 in different modes, the drive transistor M1 can maintain a consistent bias condition, thereby helping improve the display uniformity of the display panel in different modes.

It is to be noted that the working modes of the display panel mentioned in embodiments of the present disclosure include the first mode and the second mode, which does not merely refer to two working modes of the display panel 10. The first mode and the second mode are used for representing different working modes of the display panel 10. The display panel 10 may have different brightness in different working modes. In embodiments of the present disclosure, the display panel 10 has different working modes in different application scenarios so that the display panel 10 has different brightness. For ease of description, unless otherwise specified, in embodiments of the present disclosure, an example in which the working modes of the display panel 10 include two modes (the first mode and the second mode) is taken to exemplarily describe technical solutions in embodiments of the present disclosure.

It is to be understood that the first non-light emission stage T11 includes at least the bias stage Tb. In this case, the first non-light emission stage T11 may be the first non-light emission stage T11 in one-frame time. Alternatively, in this case, the first non-light emission stage T11 may further include the data write stage Ta.

Optionally, with continued reference to FIGS. 1 to 3, the one-frame time of the display panel 10 may include a data write frame DT. When the display brightness of the display panel 10 in the first mode N1 is greater than the display brightness of the display panel 10 in the second mode N2, the length of the bias maintaining stage Tc11 in the data write frame DT in the first mode is t11, and the length of the bias maintaining stage Tc21 in the data write frame DT in the second mode is t21. t11>t21.

It is to be understood that the one-frame time may include at least one non-light emission stage and at least one light emission stage that are alternately arranged. The first non-light emission stage and the first light emission stage that are in the one-frame time usually constitute one data write frame. In the non-light emission stage of the data write frame, a data signal of the previous frame of an image may be removed, and a data signal of the current frame of an image may be written. That is, the non-light emission stage of the data write frame includes at least the data write stage. When the non-light emission stage of the data write frame is the first non-light emission stage, the first non-light emission stage may include the data write stage and the bias stage.

Specifically, with continued reference to FIGS. 1 to 3, when the first non-light emission stage T11 of the data write frame DT includes the data write stage Ta and the bias stage Tb, the data write stage Ta is usually located before the bias stage Tb so that when entering the bias stage Tb, the voltage difference between the gate of the drive transistor M1 and the source/drain of the drive transistor M1 is the voltage difference between the data signal Vdata and the bias signal Vobs. In this case, the display brightness of the display panel in the first mode is greater than the display brightness of the display panel in the second mode. Accordingly, the voltage difference between the gate of the drive transistor M1 and the source/drain of the drive transistor M1 in the first mode is relatively small. The voltage difference between the gate of the drive transistor M1 and the source/drain of the drive transistor M1 in the second mode is relatively great. Therefore, when entering the first light emission stage T21 after the first non-light emission stage T11, in order to achieve that the drive transistor M1 is in the same bias condition in the first mode and in the second mode, accordingly, the voltage difference between the data signal Vdata and the bias signal Vobs is maintained in the gate of the drive transistor M1 and the source/drain of the drive transistor M1 for a relatively long time in the first mode, and the voltage difference between the data signal Vdata and the bias signal Vobs is maintained in the gate of the drive transistor M1 and the source/drain of the drive transistor M1 for a relatively short time in the second mode. In this manner, the bias caused by different data signals can be balanced. Further, it can guarantee that the bias condition of the drive transistor M1 in the light emission stage in the first mode is consistent with the bias condition of the drive transistor M1 in the light emission stage in the second mode so that the drive transistor M1 can stably supply the drive current corresponding to the data signal received by the drive transistor M1, thereby enabling the light-emitting element 200 to emit light accurately, helping with the display uniformity in different modes, and helping improve the display effect of the display panel.

In an optional embodiment, in the data write frame DT, bias signals Vobs supplied by data write modules 12 of various pixel circuits 100 to drive transistors M1 of the pixel circuits 100 may be the same or different. That is, the voltage of the bias signal Vobs in the data write frame DT may be a fixed value or a non-fixed value and may be set according to actual requirements, which is not specifically limited in embodiments of the present disclosure.

Optionally, referring to FIGS. 1 to 3, the data write module 12 for supplying the bias signal and the data signal may include a write transistor M2. In this case, the display panel 10 may further include a first signal line L1. A gate of the write transistor M2 receives the scan signal S-P so that the scan signal S-P can control the write transistor M2 to turn on or off. A first electrode of the write transistor M2 is electrically connected to the first signal line L1 so that the first signal line L1 may transmit the data signal Vdata or the bias signal Vobs. A second electrode of the write transistor M2 is electrically connected to the drive module 11. For example, the second electrode of the write transistor M2 may be electrically connected to the source of the drive transistor M1 in the drive module 11. In this case, in the data write stage Ta, the scan signal S-P controls the write transistor M2 to turn on. The first signal line L1 transmits the data signal Vdata. The data signal Vdata is received by the first electrode of the write transistor M2, transmitted to the source of the drive transistor M1, and then transmitted through the drive transistor M1 and the compensation transistor M3 to the gate of the drive transistor M1. In the bias stage Tb, the scan signal S-P controls the write transistor M2 to turn on again, the first signal line L1 transmits the bias signal Vobs, the bias signal Vobs is received by the first electrode of the write transistor M1 and transmitted to the source of the drive transistor M1. Moreover, the bias signal Vobs may also be transmitted to the drain of the drive transistor M1. In this case, it is unnecessary to provide transistors for supplying the bias signal and the data signal, simplifying the structure of the pixel circuit 100, helping improve the number of pixels circuit 100 per unit area in the display panel 10, and thereby improving the resolution of the display panel 10. Moreover, when the same write transistor M2 is provided for supplying the bias signal Vobs and the data signal Vdata, the same scan signal S-P is used for controlling the write transistor M2 to turn on in the bias stage Tb and the data write stage Ta so as to reduce the number of signals supplied to the pixel circuit 100, thereby helping simplify the structure of a shift register of the display panel 10 for supplying the scan signal S-P and helping with a narrow bezel of the display panel 10.

Gates of write transistors M2 of pixel circuits in the same row usually receive the same scan signal S-P. Write transistors M2 in the same column are usually electrically connected to the same first signal line L1. The first signal line L1 is used for the time-sharing transmission of a data signal Vdata of each write transistor M2. In this case, a bias stage Tb of pixel circuits 100 in an i-th row may overlap a data write stage Ta of pixel circuits 100 in an (i+j)-th row. A data signal Vdata of the pixel circuits 100 in the (i+j)-th row may also serve as a bias signal Vobs of the pixel circuits 100 in the i-th row. Therefore, no additional bias signal Vobs needs to be supplied to each pixel circuit 100, thereby helping reduce the number of signals supplied to the pixel circuit 100 and helping simplify the structure of the display panel 10. Correspondingly, since a difference exists between data signals Vdata of pixel circuits 100 in the same column, bias signals Vobs supplied to the pixel circuits 100 in the data write frame DT are non-fixed signals.

In other optional embodiments, when a bias signal Vobs of the pixel circuits 100 in the i-th row does not serve as a data signal Vdata of the pixel circuits 100 in the (i+j)-th row, after data write stages Ta of pixel circuits 100 in the last row, bias stages Tb of pixel circuits 100 in various rows are entered successively or simultaneously. In this case, all signal lines may transmit bias signals Vobs simultaneously. The voltage of a bias signal Vobs may be a fixed value so that the bias signals Vobs transmitted in the signal lines are unchanged, thereby preventing the signal lines from charging/discharging continuously and generating additional power consumption due to the frequent jumping of the bias signals Vobs. That is, the arrangement in which the voltage of a bias signal Vobs is a fixed value helps reduce the power consumption of the display panel 10.

Figure 4:
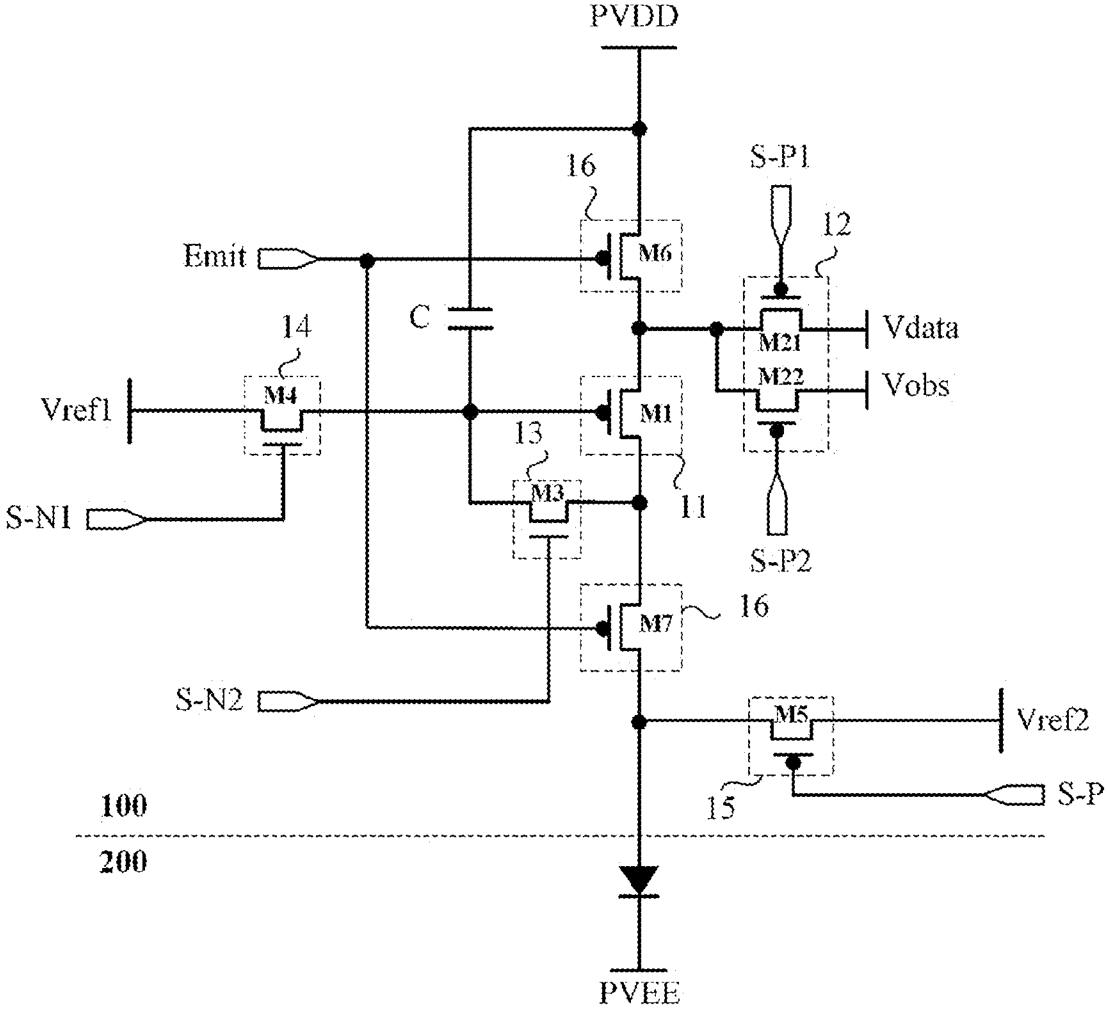
FIG. 4 is another diagram illustrating the structure of a pixel circuit in a display panel according to an embodiment of the present disclosure.

In another optional embodiment, FIG. 4 is another diagram illustrating the structure of a pixel circuit in a display panel according to an embodiment of the present disclosure. As shown in FIG. 4, the data write module 12 may include a first transistor M21 and a second transistor M22. A gate of the first transistor M21 receives a first scan signal S-P1. A first electrode of the first transistor M21 receives the data signal Vdata. A second electrode of the first transistor M21 is electrically connected to the drive module 11. For example, the second electrode of the first transistor M21 may be electrically connected to the source of the drive transistor M1 in the drive module 11. In the data write stage Ta, the first scan signal S-P1 controls the first transistor M21 to turn on so that the data signal Vdata can be transmitted to the gate of the drive transistor M1 through the first transistor M21, the drive transistor M1, and the compensation module 13. A gate of the second transistor M22 receives a second scan signal S-P2. A first electrode of the second transistor M22 receives the bias signal Vobs. A second electrode of the second transistor M22 is electrically connected to the drive module 11. For example, the second electrode of the second transistor M22 may be electrically connected to the source of the drive transistor M1 in the drive module 11. In the bias stage, the second scan signal S-P2 controls the second transistor M22 to turn on so that the bias signal Vobs can be transmitted to the source of the drive transistor M1 and the drain of the drive transistor M1. In this case, different transistors are configured to transmit the data signal Vdata and the bias signal Vobs so that the transmission of the data signal Vdata and the transmission of the bias signal Vobs do not affect each other, helping improve the accuracy of the transmitted signals.

It is to be understood that FIG. 4 merely exemplarily illustrates the case where the second electrode of the first transistor M21 and the second electrode of the second transistor M22 are each electrically connected to the source of the drive transistor M1. In other embodiments of the present disclosure, one of the first transistor or the second transistor may be electrically connected to the source of the drive transistor, and the other may be electrically connected to the drain of the drive transistor. On the premise that the core invention points of embodiments of the present disclosure can be implemented, the connection mode of the first transistor and the drive transistor and the connection mode of the second transistor and the drive transistor are not specifically limited in embodiments of the present disclosure.

Optionally, referring to FIG. 2 or 4, the pixel circuit 100 may further include an initialization module 14. One end of the initialization module 14 receives an initialization signal Vref1, and the other end of the initialization module 14 is electrically connected to the gate of the drive transistor M1. In an initialization stage Td, the initialization module 14 can transmit the initialization signal Vref1 to the gate of the drive transistor M1 to initialize the gate of the drive transistor M1.

Specifically, the initialization module 14 may turn on or off in the control of the scan signal S-N1. When the scan signal S-N1 controls the initialization module 14 to turn on, the initialization signal Vref1 is transmitted to the gate of the drive transistor M1. In this case, the initialization module 14 may include an initialization transistor M4. A gate of the initialization transistor M4 receives the scan signal S-N1. A first electrode of the initialization transistor M4 receives the initialization signal Vref1. A second electrode of the initialization transistor M4 and the gate of the drive transistor M1 are electrically connected at the gate of the drive transistor M1.

Optionally, with continued reference to FIG. 2 or 4, the pixel circuit 100 may further include a reset module 15. The reset module 15 can supply a reset signal Vref2 to the anode of the light-emitting element 200 in a reset stage to reset the anode of the light-emitting element 200, preventing a signal supplied to the anode of the light-emitting element 200 in the previous light emission stage from affecting the light emission accuracy of the light-emitting element 200 in the next light emission stage. In this case, the reset stage where the reset module 15 supplies the reset signal Vref2 to the light-emitting element 200 should be located in the non-light emission stage before the light emission stage. Specifically, one end of the reset module 15 may receive the reset signal Vref2, and the other end of the reset module 15 may be electrically connected to the anode of the light-emitting element 200. The reset module 15 may also turn on or off in the control of the scan signal S-P. Moreover, when the scan signal S-P controls the reset module 15 to turn on, the reset module 15 can transmit the reset signal Vref2 to the anode of the light-emitting element 200 to reset the light-emitting element 200. In this case, the reset module 15 may include a reset transistor M5. A gate of the reset transistor M5 may receive the scan signal S-P. A first electrode of the reset transistor M5 receives the reset signal Vref2. A second electrode of the reset transistor M5 is electrically connected to the anode of the light-emitting element 200. In this case, the reset stage and the data write stage Ta may be the same stage so as to shorten the length of the non-light emission stage T1 between light emission stages T2, thereby guaranteeing enough length of the light emission stage T2 and guaranteeing the display brightness of the display panel 10.

Optionally, with continued reference to FIG. 2 or 4, the pixel circuit 100 may further include a light emission control module 16. The light emission control module 16 can control the time when the drive transistor M1 supplies the drive current to the light-emitting element 200 in the light emission stage T2. The light emission control module 16 may be connected to the light-emitting element 200 and the drive transistor M1 in series between the positive power signal terminal and the negative power signal terminal. The light emission control module 16 may include a first light emission control transistor M6 and a second light emission control transistor M7. A gate of the first light emission control transistor M6 and a gate of the second light emission control transistor M7 each receive a light emission control signal Emit. The light emission control signal Emit may control the first light emission control transistor M6 and the second light emission control transistor M7 to turn on or off simultaneously. A first electrode of the first light emission control transistor M6 receives the positive power signal PVDD. A second electrode of the first light emission control transistor M6 is electrically connected to the source of the drive transistor M1. A first electrode of the second light emission control transistor M7 is electrically connected to the drain of the drive transistor M1. A second electrode of the second light emission control transistor M7 is electrically connected to the anode of the light-emitting element 200.

It is to be understood that the type of each transistor in the pixel circuit 100 may be set according to requirements. For example, in order to avoid the stability of the voltage of the gate of the drive transistor M1 in a non-data write stage and in a non-initialization stage, the initialization transistor M4 and the compensation transistor M3 may be set as NMOS-type transistors, while other transistors may be set as PMOS-type transistors. An NMOS-type transistor may turn on when a voltage difference between a gate of the NMOS-type transistor and a source of the NMOS-type transistor is greater than a threshold voltage of the NMOS-type transistor. A PMOS-type transistor may turn on when a voltage difference between a gate of the PMOS-type transistor and a source of the PMOS-type transistor is smaller than a threshold voltage of the PMOS-type transistor. Therefore, signals supplied to gates of various transistors may be adaptively adjusted so that the transistors can be on when the transistors should be on.

Additionally, with continued reference to FIG. 2 or 4, the pixel circuit 100 may further include a storage capacitor C. The storage capacitor C may be used for storing the potential of the gate of the drive transistor M1. The specific connection mode of the storage capacitor C may be determined according to a specific condition. On the premise that the potential of the gate of the drive transistor M1 can be stored, the connection mode of the storage capacitor C is not limited in embodiments of the present disclosure.

In other optional embodiments, when the voltage of the bias signal of the data write frame in the first mode N1 is V3, and when the voltage of the bias frame of the data write frame in the second mode N2 is V4, V4≠V3.

Specifically, the voltage of the gate of the drive transistor M1 in the data write frame DT in the first mode is different from the voltage of the gate of the drive transistor M1 in the data write frame DT in the second mode. In this case, the voltage of the bias signal of the data write frame DT in the first mode N1 is set to V3, and the voltage of the bias frame of the data write frame DT in the second mode N2 is set to V4. V3 and V4 are different values so that the bias conditions of the drive transistor in different modes are adjusted pertinently. Therefore, in the light emission stage T2 in different modes, the drive transistor M1 can maintain a consistent bias condition.

Figure 5:
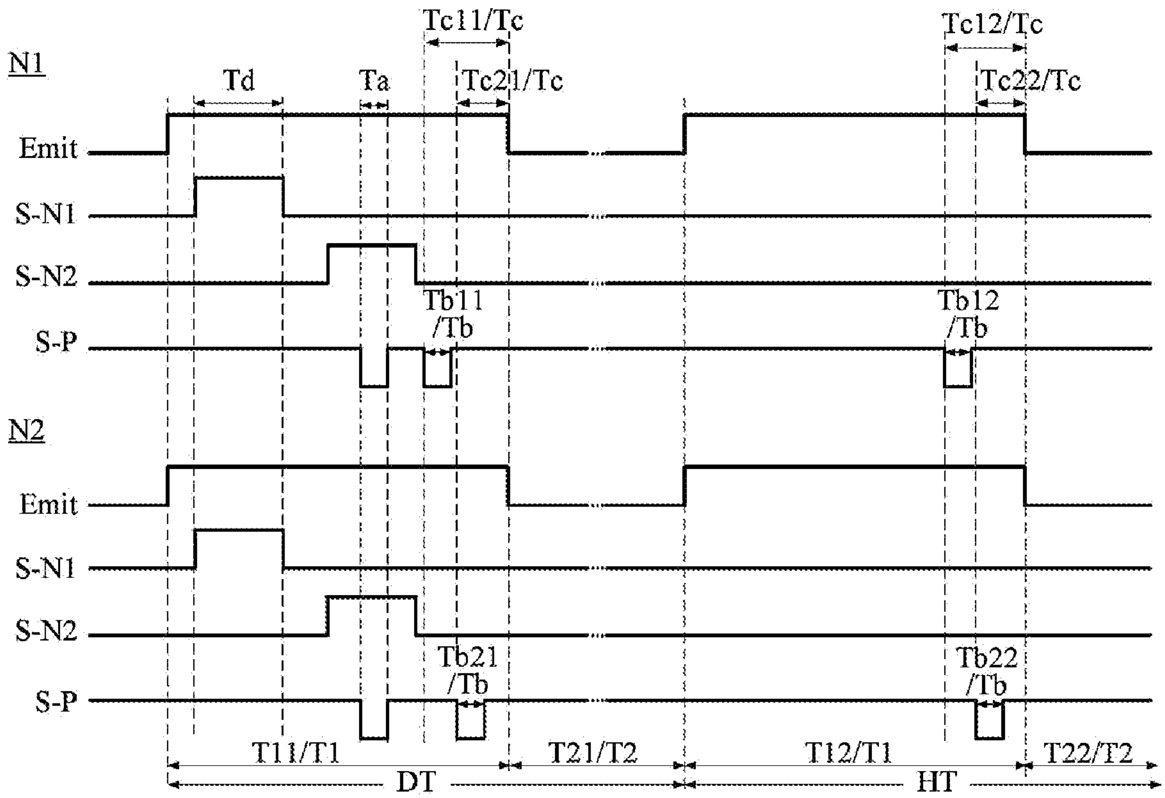
FIG. 5 is another drive timing diagram of a pixel circuit in a display panel according to an embodiment of the present disclosure.
Figure 6:
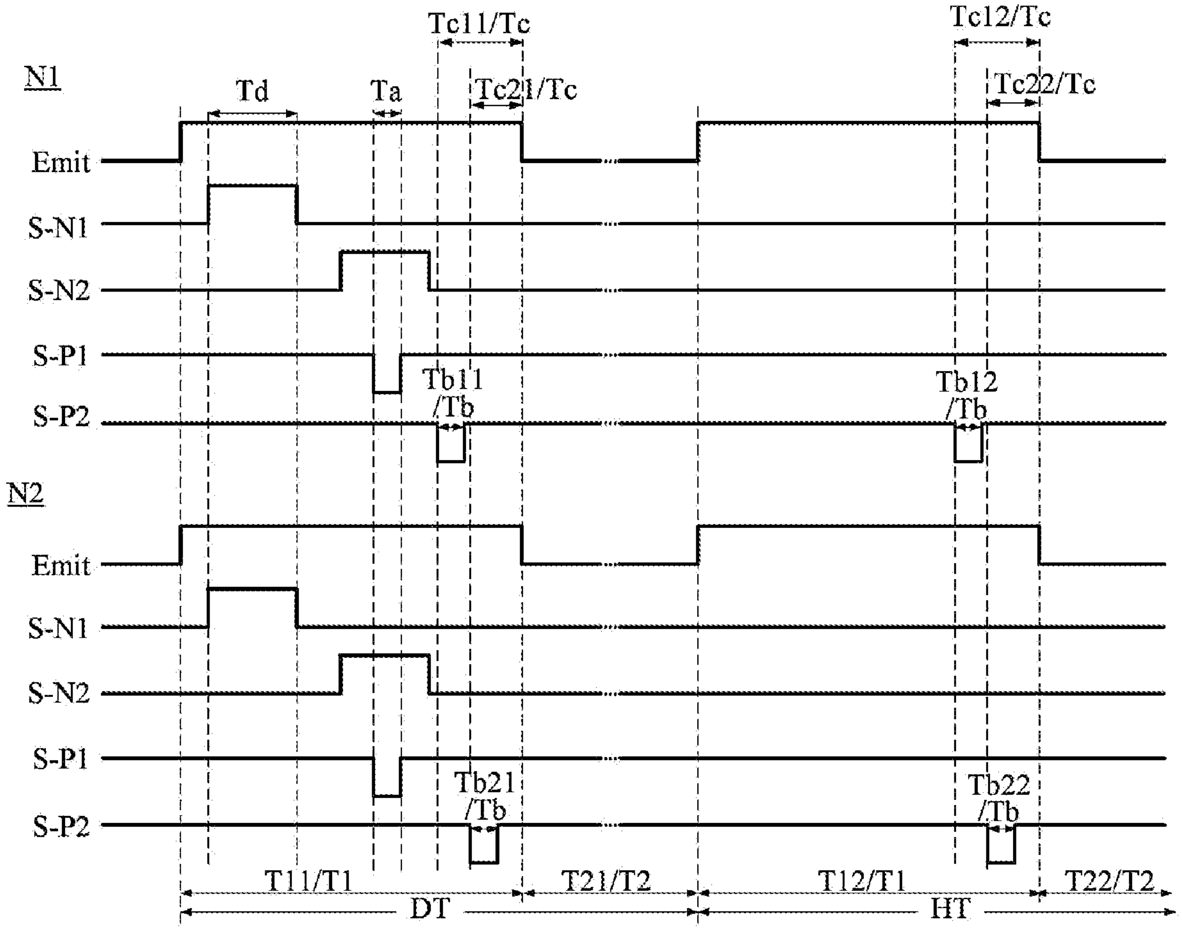
FIG. 6 is another drive timing diagram of a pixel circuit in a display panel according to an embodiment of the present disclosure.

Optionally, FIG. 5 is another drive timing diagram of a pixel circuit in a display panel according to an embodiment of the present disclosure. FIG. 6 is another drive timing diagram of a pixel circuit in a display panel according to an embodiment of the present disclosure. Referring to FIGS. 1, 2, and 4 to 6, when the one-frame time of the display panel 10 further includes at least one retention frame HT, the length of a bias maintaining stage in a retention frame in the first mode is t12, and the length of the bias maintaining stage in the retention frame in the second mode is t22. t12>t22.

It is to be noted that FIGS. 5 and 6 merely exemplarily illustrate the case where the one-frame time of the display panel 10 includes one retention frame HT. In embodiments of the present disclosure, the number of retention frames in the one-frame time of the display panel 10 may be any non-negative integer. It is to be understood that the number of retention frames during the time for displaying one frame of image by the display panel is related to a multiple relationship between a basic refresh rate and a display refresh rate at which the display panel performs display. For example, when the display refresh rate is one-half of the basic refresh rate, the number of retention frames during the time for displaying one frame of image is 1. When the display refresh rate is one-third of the basic refresh rate, the number of retention frames during the time for displaying one frame of image is 2. For ease of description, in embodiments of the present disclosure, an example in which the one-frame time includes one data write frame and one retention frame HT is taken for exemplarily describing technical solutions in embodiments of the present disclosure.

With continued reference to FIGS. 1, 2, and 4 to 6, when the one-frame time of the display panel 10 includes the data write frame DT and the retention frame HT, and when a non-light emission stage T12 of the retention frame HT is also a first non-light emission stage, the non-light emission stage T12 of the retention frame HT includes a bias stage Tb22. In the bias stage Tb22, the data write module 12 can also supply the bias signal Vobs to the source/drain of the drive transistor M1 to perform a bias adjustment for the drive transistor M1 by using the bias signal Vobs. Moreover, at least one light emission stage T2 is before the first non-light emission stage T12 of the retention frame HT, the bias signal Vobs supplied to the drive transistor M1 in the bias stage Tb22 of the retention frame HT can adjust the bias generated by the drive transistor M1 in the light emission stage T2 before the retention frame HT.

It is to be understood that for the case where the drive transistor M1 is a PMOS-type transistor, the voltage of the gate of the drive transistor M1 is smaller than the voltage (PVDD) of the source of the drive transistor M1 in the light emission stage T2 so that the voltage difference between the gate of the drive transistor M1 and the source of the drive transistor M1 is a negative value. Moreover, the display brightness of the display panel in the first mode is greater than the display brightness of the display panel in the second mode so that the voltage of the data signal Vdata at the gate of the drive transistor M1 in the light emission stage T2 in the first mode N1 is greater than the voltage of the data signal Vdata at the gate of the drive transistor M1 in the light emission stage T2 in the second mode N2. The voltage of the data signal Vdata is usually a positive value so that the absolute value of the voltage difference between the gate of the drive transistor M1 and the source of the drive transistor M1 in the light emission stage T2 in the first mode N1 is greater than the absolute value of the voltage difference between the gate of the drive transistor M1 and the source of the drive transistor M1 in the light emission stage T2 in the second mode N2. Therefore, the ion polarization in the drive transistor M1 is to a relatively high degree after the light emission stage T2 in the first mode N1, and the ion polarization in the drive transistor M1 is to a relatively low degree after the light emission stage T2 in the second mode N2. Accordingly, the drive transistor M1 may be in bias states to different degrees after the light emission stage T2 in different modes. In this case, the length of the bias maintaining stage Tc12 in the retention frame HT in the first mode N1 is relatively great. The length of the bias maintaining stage Tc22 in the retention frame HT in the second mode N2 is relatively small. Accordingly, the ion polarization in the drive transistor M1 is to a relatively high degree in the bias maintaining stage Tc12 in the retention frame HT in the first mode N1, while the ion polarization in the drive transistor M1 is to a relatively low degree in the bias maintaining stage Tc22 in the retention frame HT in the second mode N2, thereby balancing the bias degree of the drive transistor M1 in the light emission stage of the retention frame HT. Therefore, when entering the next light emission stage T22 in different modes, the drive transistor M1 can maintain a consistent bias state, thereby helping improve the display uniformity of the display panel in different modes and guaranteeing that the display panel can present the corresponding display brightness accurately.

In an optional embodiment, in the retention frame HT, bias signals Vobs supplied by data write modules 12 of various pixel circuits 100 to drive transistors M1 of the pixel circuits 100 may be the same or different. That is, the voltage of the bias signal Vobs in the retention frame HT may be a fixed value or a non-fixed value and may be set according to actual requirements, which is not specifically limited in embodiments of the present disclosure. When the voltage of the bias signal Vobs in the retention frame HT is a fixed value, it is unnecessary to frequently adjust the voltage of the bias signal in the retention frame, preventing a voltage fluctuation on a signal line for transmitting the bias signal Vobs from generating additional power consumption and thereby helping with the low power consumption of the display panel.

In other optional embodiments, when the voltage of the bias signal of the retention frame in the first mode N1 is V3, and when the voltage of the bias frame of the retention frame in the second mode N2 is V4, V4≠V3.

Specifically, the voltage of the gate of the drive transistor M1 in the retention frame HT in the first mode is different from the voltage of the gate of the drive transistor M1 in the retention frame HT in the second mode. In this case, the voltage of the bias signal of the retention frame HT in the first mode N1 is set to V3, and the voltage of the bias frame of the retention frame HT in the second mode N2 is set to V4. V3 and V4 are different values so that the bias conditions of the drive transistor in different modes are adjusted pertinently. Therefore, in the light emission stage T2 in different modes, the drive transistor M1 can maintain a consistent bias condition.

In another optional embodiment, in the data write frame DH, after the bias signal is supplied to the source/drain of the drive transistor M1, the bias caused by writing the data signal to the gate of the drive transistor M1 can be counteracted or weakened. In the retention frame HT, after the bias signal is supplied to the source/drain of the drive transistor M1, the bias of the drive transistor M1 in the light emitting stage T21 before the retention frame HT can be adjusted. That is, there is a difference between a target of a bias adjustment to the drive transistor M1 in the data write frame DT and a target of a bias adjustment to the drive transistor M1 in the retention frame HT. Therefore, the voltage of the bias signal Vobs supplied to the drive transistor M1 may be adjusted pertinently according to the target of each bias adjustment so that the voltage of the bias signal Vobs in the retention frame HT and the voltage of the bias signal Vobs in the data write frame DT may be unequal.

In other optional embodiments, the voltage of the bias signal Vobs in the retention frame HT and the voltage of the bias signal Vobs in the data write frame DT may also be equal to meet special display and driving requirements. On the premise of performing a bias adjustment for the drive transistor M1, this is not specifically limited in embodiments of the present disclosure.

Optionally, referring to FIGS. 1, 2, and 4 to 6, when the one-frame time of the display panel 10 includes the data write frame DT and the retention frame HT, t11=t12, and/or t21=t22. In this case, in the same mode, the length of the bias maintaining stage Tc in the data write frame DH is the same as the length of the bias maintaining stage in the retention frame HT. That is, in different frames (the data write frame and the retention frame) in the same mode, the time between the start moment of the bias stage Tb and the start moment of the first light emission stage T2 is the same so that it is unnecessary to adjust the relative time of the start moment of the bias stage Tb when one frame of image is displayed by the display panel, thereby helping simplify the drive timing of the display panel 10, reducing the operational capability of a driver chip for driving the display panel 10, and thus helping with a low cost of the display panel 10.

It is to be understood that the preceding example in which the length t11 of the bias maintaining stage Tc11 in the data write frame DT is the same as the length t12 of the bias maintaining stage Tc12 in the retention frame HT in the first mode N1 and in which the length t21 of the bias maintaining stage Tc21 in the data write frame DT is the same as the length t22 of the bias maintaining stage Tc22 in the retention frame HT in the second mode N2 is used for making an exemplary description. In other embodiments of the present disclosure, the relationship between the length of the bias maintaining stage in the data write frame DT and the length of the bias maintaining stage in the retention frame HT in the same mode may be set according to requirements, which is not specifically limited in embodiments of the present disclosure.

Figure 7:
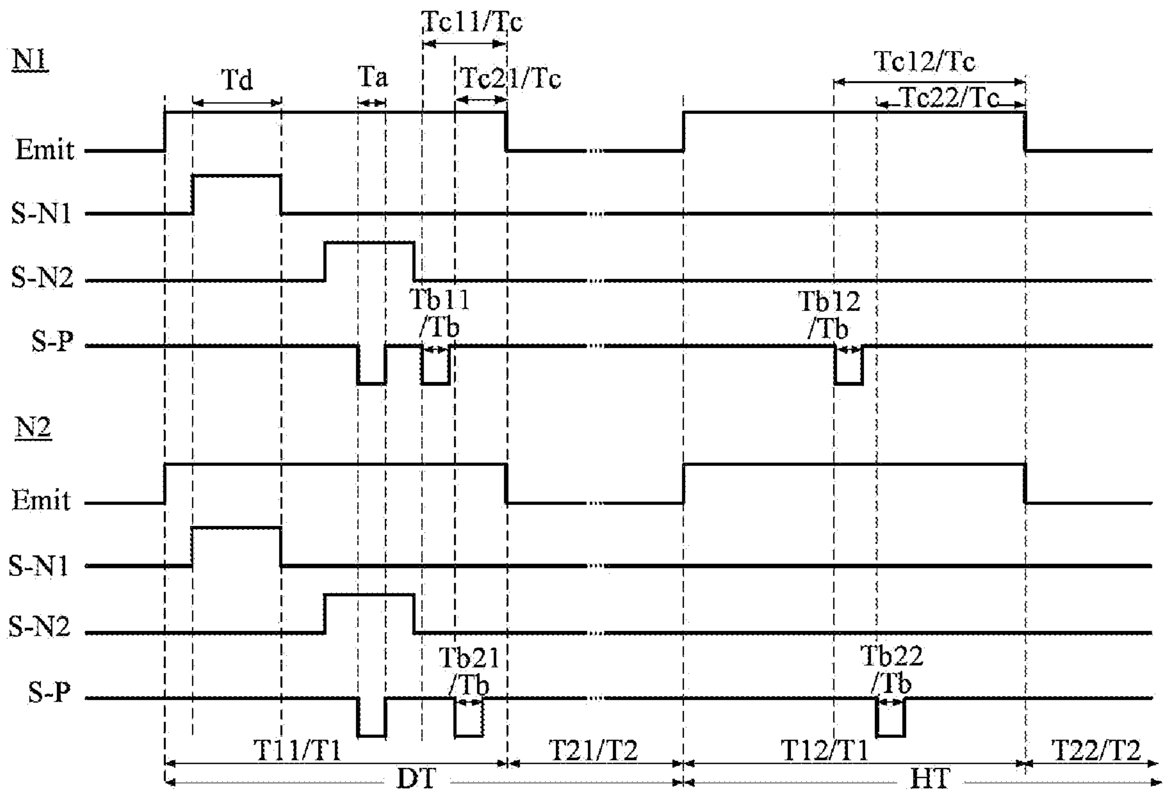
FIG. 7 is another drive timing diagram of a pixel circuit in a display panel according to an embodiment of the present disclosure.
Figure 8:
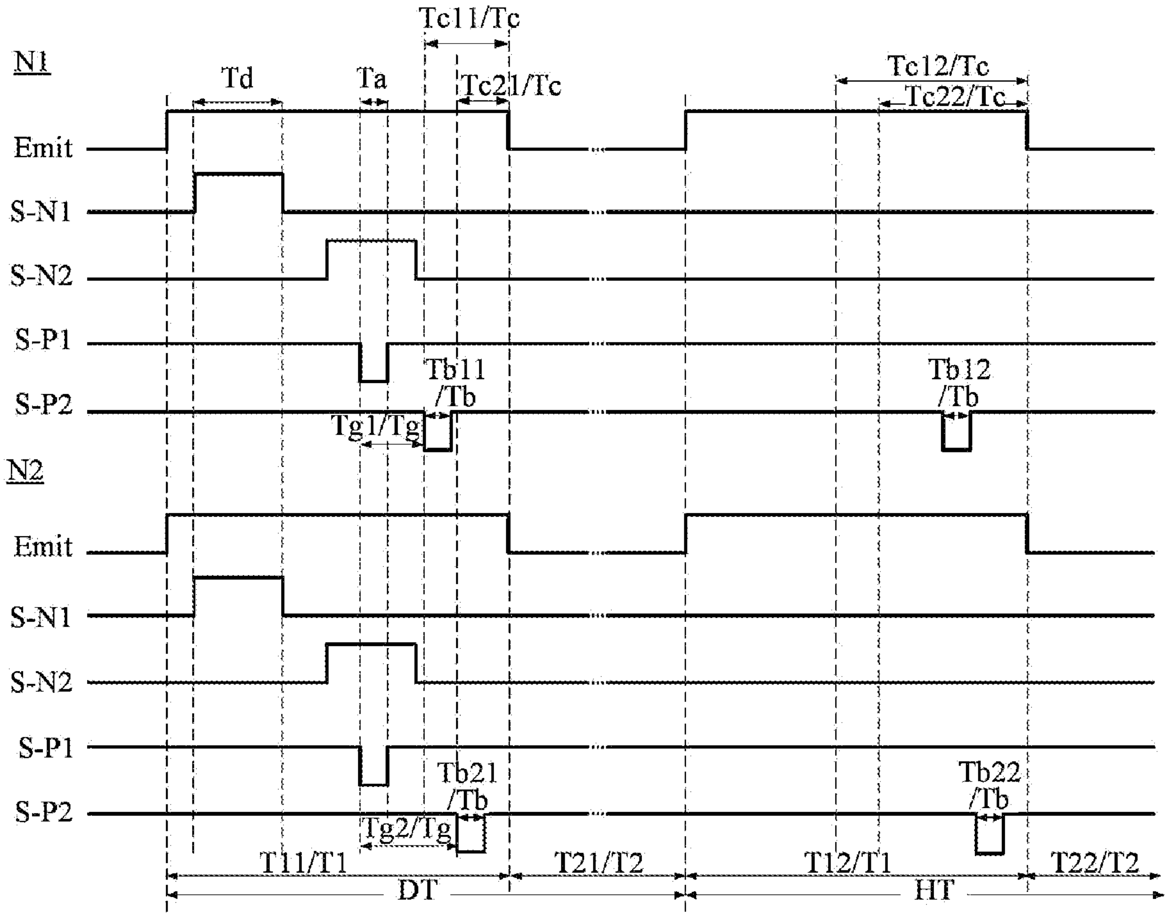
FIG. 8 is another drive timing diagram of a pixel circuit in a display panel according to an embodiment of the present disclosure.

In an optional embodiment, FIG. 7 is another drive timing diagram of a pixel circuit in a display panel according to an embodiment of the present disclosure. FIG. 8 is another drive timing diagram of a pixel circuit in a display panel according to an embodiment of the present disclosure. Referring to FIGS. 1, 2, 4, 7, and 8, when the one-frame time of the display panel includes the data write frame DT and the retention frame HT, t1≠t12, and t21≠t22. That is, the length of the bias maintaining stage in the data write frame DT is different from the length of the bias maintaining stage in the retention frame HT in the same mode.

Specifically, in the data write frame DH, the length of the bias maintaining stage Tc11/Tc21 may be set regarding the voltage of the data signal written to the gate of the drive transistor M1 in the data write stage Ta to balance the bias caused by the written data signal. In the retention frame HT, the length of the bias maintaining stage Tc12/Tc22 may be set based on the bias condition of the drive transistor in the light emission stage T21 before the retention frame HT so that the drive transistor can supply the drive current accurately in the next light emission stage T22. With this arrangement, a certain difference exists between the degree of the bias adjustment to the drive transistor M1 in the bias maintaining stage Tc in the data write frame DT and the degree of the bias adjustment to the drive transistor M1 in the bias maintaining stage Tc in the retention frame HT. In this case, the length of the bias maintaining stage Tc in the data write frame DT and the length of the bias maintaining stage Tc in the retention frame HT may be set pertinently so that the drive transistor M1 can maintain a consistent bias condition in each light emission stage T2. Therefore, the drive current generated by the drive transistor M1 remains consistent in each light emission stage T2 of the same frame of image, thereby helping improve the display uniformity of the display panel.

In other optional embodiments, the length t11 of the bias maintaining stage Tc11 in the data write frame DT is the same as the length t12 of the bias maintaining stage Tc12 in the retention frame HT in the first mode N1. The length t21 of the bias maintaining stage Tc21 in the data write frame DT is different from the length t22 of the bias maintaining stage Tc22 in the retention frame HT in the second mode N2. That is, t11=t12, and t21≠t22. Alternatively, the length t21 of the bias maintaining stage Tc21 in the data write frame DT is the same as the length t22 of the bias maintaining stage Tc22 in the retention frame HT in the second mode N2. The length t11 of the bias maintaining stage Tell in the data write frame DT is different from the length t12 of the bias maintaining stage Tc12 in the retention frame HT in the first mode N1. That is, t11≠t12, and t21=t22. On the premise that the core disclosure points of embodiments of the present disclosure can be implemented, this is not limited in embodiments of the present disclosure.

It is to be understood that the preceding drive timing diagrams are merely exemplary drive timing diagrams of embodiments of the present disclosure. Each drive timing diagram illustrates that the number of bias stages Tb included in the data write frame DT and the number of bias stages Tb included in the retention frame HT are the same and are each 1. In other embodiments of the present disclosure, the data write frame DT and the retention frame HT may also include a plurality of bias stages Tb. Moreover, the number of bias stages Tb included in the data write frame DT may be the same as or different from the number of bias stages Tb included in the retention frame HT, which may be set according to actual requirements and is not specifically limited in embodiments of the present disclosure.

Figure 9:
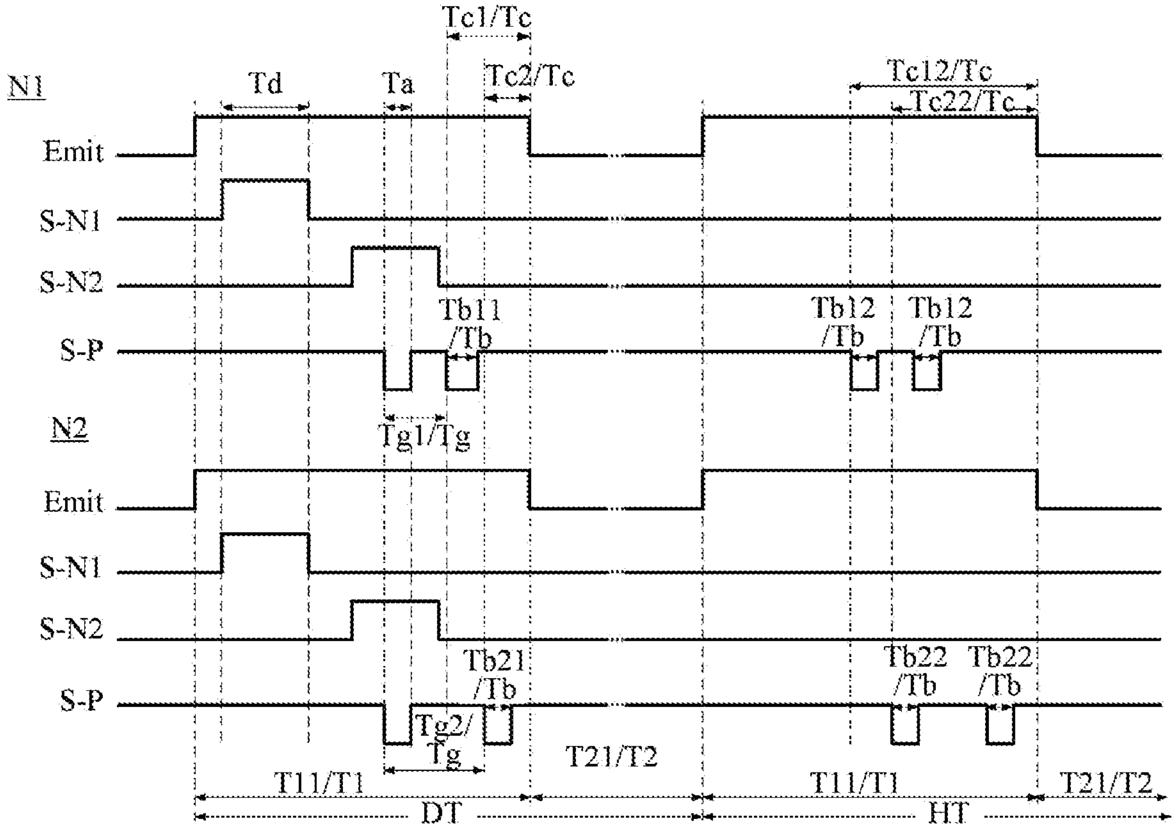
FIG. 9 is a drive timing diagram of the pixel circuit in the display panel corresponding to FIG. 2.

In an exemplary embodiment, FIG. 9 is a drive timing diagram of the pixel circuit in the display panel corresponding to FIG. 2. Referring to FIGS. 2 and 9, the write transistor M2 supplies the data signal Vdata in the data write stage Ta and supplies the bias signal Vobs in the bias stage Tb. In the data write frame DH, the scan signal S-P for controlling the write transistor M2 to turn on includes two effective pulses. The time of one effective pulse is the data write stage Ta, and the time of the other effective pulse is the bias stage Tb11/Tb21. The duration from the data write stage Ta to the start moment of the next light emission stage T21 is t01. In the retention frame HT, the scan signal S-P for controlling the write transistor M2 to turn on may also include two effective pulses. The time of each of the two effective pulses is the bias stage Tb12/Tb22 so that the retention frame HT includes two bias stages Tb12/Tb22. The duration from the start moment of the first bias stage Tb12/Tb22 to the start moment of the next bias stage Tb12/Tb22 is t02. In this case, t01 may be equal to t02. With this arrangement, the number of bias stages Tb in the data write frame DT is different from the number of bias stages Tb in the retention frame HT. The number of effective pulses of the scan signal S-P in the data write frame DT is the same as the number of effective pulses of the scan signal S-P in the retention frame HT. Moreover, the relative time of the start moment of each effective pulse is the same. Therefore, the control logic for supplying the scan signal S-P in the data write frame DT is the same as the control logic for supplying the scan signal S-P in the retention frame HT, helping simplify the control mode of the display panel.

It is to be understood that when the first non-light emission stage T11 includes the data write stage Ta and the bias stage Tb. The interval time between the data write stage Ta and the bias stage Tb may be a fixed value. Alternatively, the interval time between the data write stage Ta and the bias stage Tb in different modes may also be different. A specific implementation may be designed according to actual requirements and is not specifically limited in embodiments of the present disclosure.

Optionally, referring to FIGS. 2 and 7 or FIGS. 4 and 8, when the first non-light emission stage T11 further includes the data write stage Ta, in the first non-light emission stage T11, a third time period Tg is from the start moment of the data write stage Ta to the start moment of the bias stage Tb. In this case, the length of the third time period Tg1 in the first mode N1 is different from the length of the third time period Tg2 in the second mode N2.

Specifically, when entering the data write stage Ta, the data signal Vdata may be supplied to the source of the drive transistor M1 through the data write module 12, to the drain of the drive transistor M1 through the drive transistor M1, and to the gate of the drive transistor M1 through the compensation module 13 so that the voltage of the source of the drive transistor M1, the voltage of the drain of the drive transistor M1, and the voltage of the gate of the drive transistor M1 each begin to approach the voltage of the data signal Vdata. In this case, the data signal Vdata supplied to the source of the drive transistor M1, the drain of the drive transistor M1, and the gate of the drive transistor M1 may be used for performing a bias adjustment for the drive transistor M1. Moreover, before the signal supplied to the source of the drive transistor M1, the drain of the drive transistor M1 and the gate of the drive transistor M1, the source of the drive transistor M1, the drain of the drive transistor M1 and the gate of the drive transistor M1 may be maintained at voltages in the data write stage Ta. That is, in the third time period Tg between the start moment of the data write stage Ta and the start moment of the bias stage Tb, the source of the drive transistor M1, the drain of the drive transistor M1, and the gate of the drive transistor M1 may be maintained at the voltages in the data write stage Ta. Moreover, because the brightness of the display panel in the first mode N1 is different from the brightness of the display panel in the second mode N2, different data signals Vdata are supplied to the drive transistor M1 in the first mode N1 and in the second mode N2. Accordingly, a difference exists between the degree of the bias adjustment to the drive transistor M1 by using the data signal Vdata supplied to the drive transistor M1 in the first mode and the bias adjustment to the drive transistor M1 by using the data signal Vdata supplied to the drive transistor M1 in the second mode N2. In this case, the third time period Tg1 in the first mode N1 may be different from the third time period Tg2 in the second mode N2. That is, the duration of the bias adjustment to the drive transistor M1 by using the data signal in the first mode N1 is different from the duration of the bias adjustment to the drive transistor M1 by using the data signal Vdata in the second mode N2 so that the drive transistor M1 has different bias degrees in different modes due to different durations of bias adjustments by using the data signals Vdata. Therefore, the bias generated by different signals Vdata written to the source of the drive transistor M1, the drain of the drive transistor M1, and the gate of the drive transistor M1 can be at least partially balanced, thereby improving the consistency of the bias state of the drive transistor M1 when the first light emission stage T21 in different modes is entered, and thus helping improve the display uniformity of the display panel in different modes.

In an optional embodiment, with continued reference to FIGS. 2 and 7 or FIGS. 4 and 8, when the display brightness of the display panel in the first mode N1 is greater than the display brightness of the display panel in the second mode N1, the length of the third time period Tg1 in the first mode N1 is t32, and the length of the third time period Tg2 in the second mode N2 is t42. In this case, t32<t42. In this case, in the first mode N1, the duration in which the source of the drive transistor M1, the drain of the drive transistor M1, and the gate of the drive transistor M1 approach the data signal Vdata is relatively short. In the second mode N2, the duration in which the source of the drive transistor M1, the drain of the drive transistor M1, and the gate of the drive transistor M1 approach the data signal Vdata is relatively long. Accordingly, the voltage of the drive signal Vdata supplied to the drive transistor M1 in the first mode N1 is relatively low, and the voltage of the drive signal Vdata supplied to the drive transistor M1 in the second mode N2 is relatively great, balancing the bias condition of the drive transistor M1 in the first mode N1 and the bias condition of the drive transistor M1 in the second mode N2. Therefore, at the start moment of the bias stage Tb, the bias conditions of the drive transistor in different modes may tend to be consistent.

Optionally, with continued reference to FIGS. 2 and 7 or FIGS. 4 and 8, the length of the bias maintaining stage Tc11 in the first mode N1 is t10, and the length of the bias maintaining stage Tc21 in the second mode N2 is t20. In this case, t10+t32=t20+t42. In this case, the duration between the start moment of the data write stage Ta and the start moment of the first light emission stage T21 in the first mode N1 is the same as the duration between the start moment of the data write stage Ta and the start moment of the first light emission stage T21 in the second mode N2, thereby resulting in the same duration in which a data signal is maintained at the drive transistor M1 in different modes. Moreover, in this time period, the arrangement of different durations when the source/drain of the drive transistor M1 is maintained at different voltages enables the drive transistor M1 to maintain a consistent bias condition when entering the first light emission stage T21 in different modes, thereby helping improve the display uniformity of the display panel in different modes.

Figure 10:
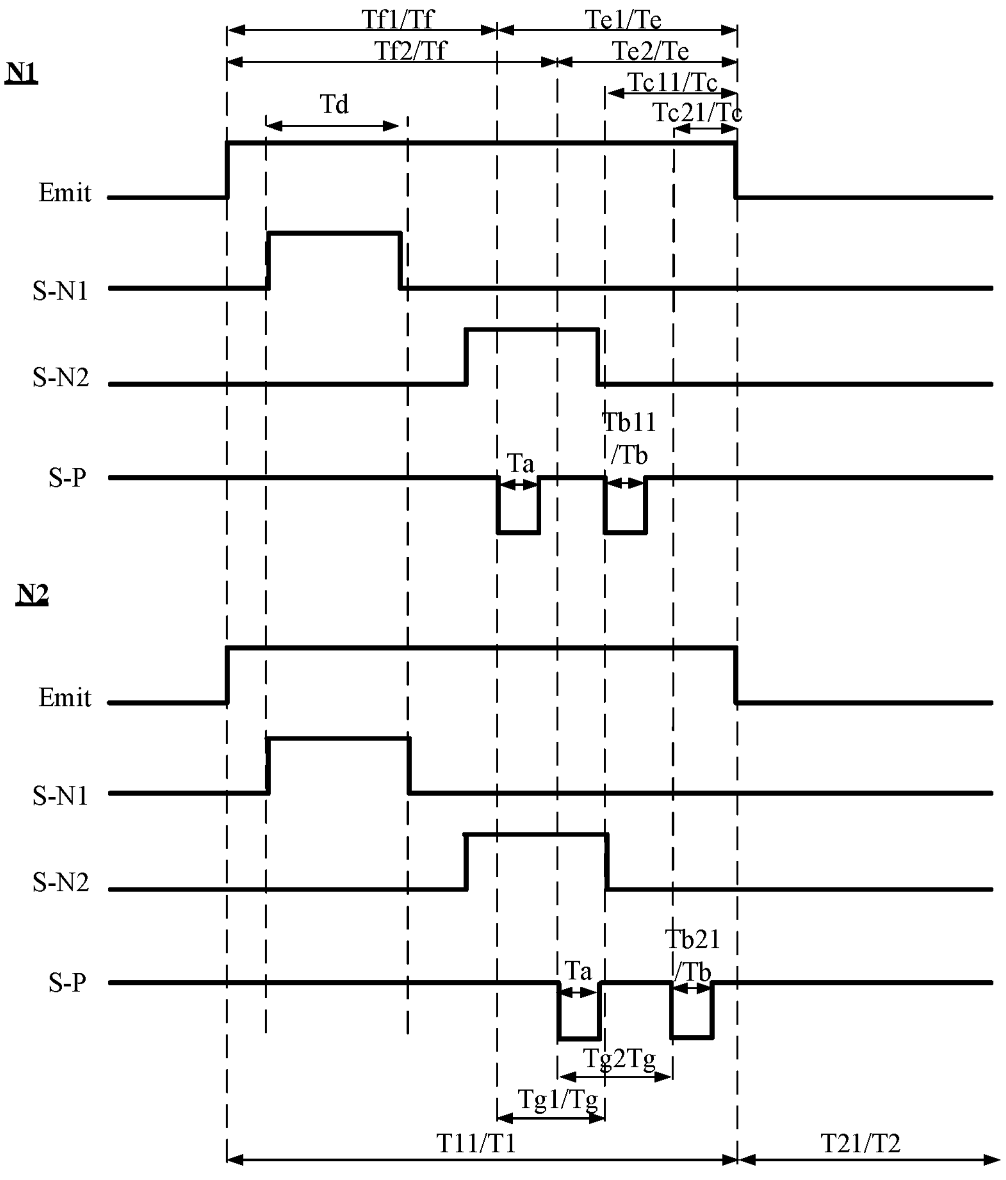
FIG. 10 is another drive timing diagram of a pixel circuit in a display panel according to an embodiment of the present disclosure.
Figure 11:
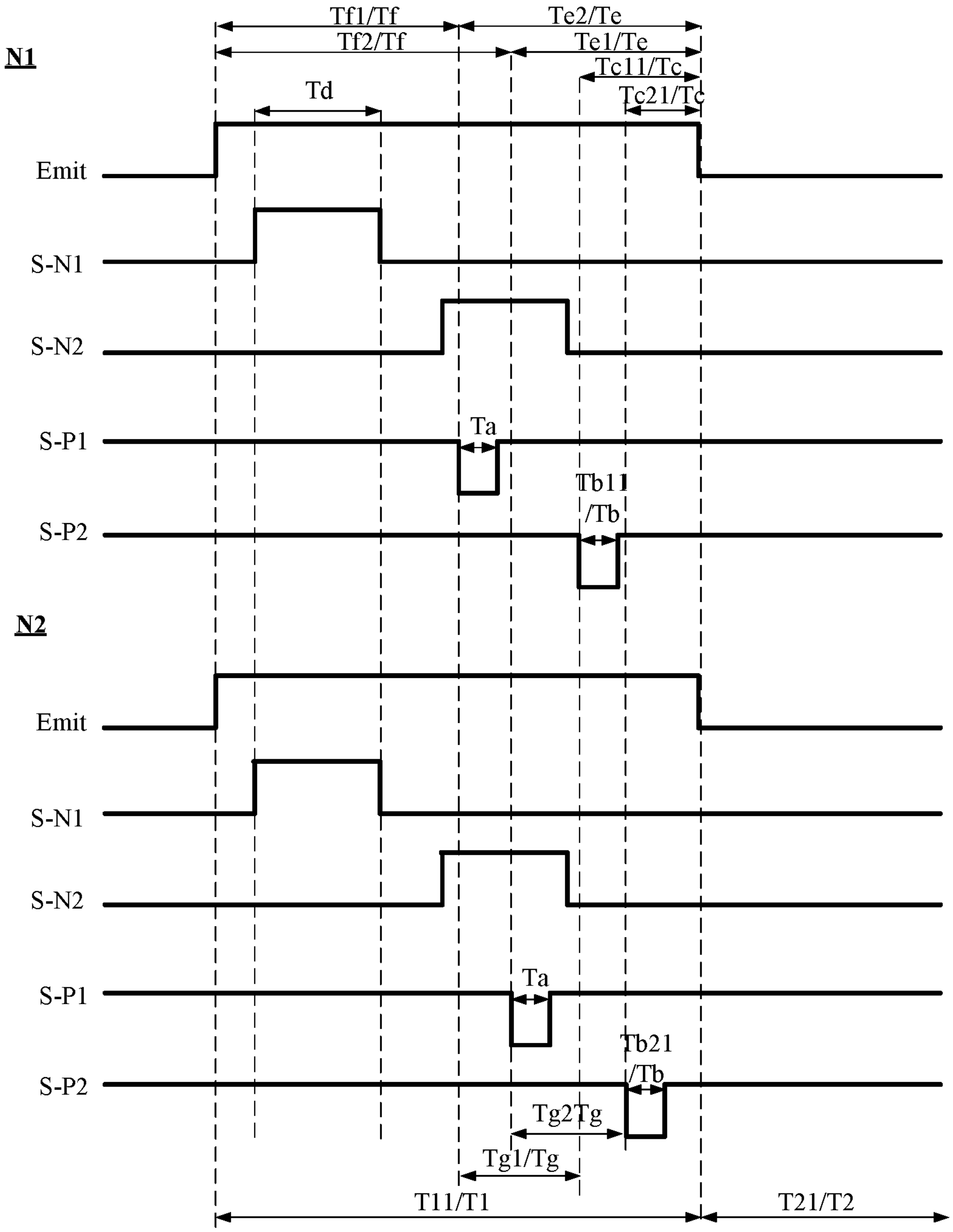
FIG. 11 is another drive timing diagram of a pixel circuit in a display panel according to an embodiment of the present disclosure.

In other embodiments, FIG. 10 is another drive timing diagram of a pixel circuit in a display panel according to an embodiment of the present disclosure. FIG. 11 is another drive timing diagram of a pixel circuit in a display panel according to an embodiment of the present disclosure. Referring to FIGS. 2 and 10 or FIGS. 4 and 11, when the first non-light emission stage T11 includes the data write stage Ta, and when in the first non-light emission stage T11, the third time period Tg is from the start moment of the data write stage Ta to the start moment of the bias stage Tb, the length of the third time period Tg1 in the first mode N1 is t30, and the length of the third time period Tg2 in the second mode N2 is t40. In this case, t30=t40.

With this arrangement, the duration in which a signal at the gate of the drive transistor M1, the source of the drive transistor M1, and the drain of the drive transistor M1 approaches the data signal Vdata in the first mode N1 can be the same as the duration in which a signal at the gate of the drive transistor M1, the source of the drive transistor M1, and the drain of the drive transistor M1 approaches the data signal Vdata in the second mode N2 so that the bias condition of the drive transistor M1 in entering the bias stage Tb11 in the first mode N1 is different from the bias condition of the drive transistor M1 in entering the bias stage Tb21 in the second mode N2. Subsequently, bias adjustments to different degrees may be performed for the drive transistor M1 in the bias maintaining stage Tc11 in the first mode N1 and in the bias maintaining stage Tc12 in the second mode N2 so that the drive transistor M1 may maintain a consistent bias condition when entering the first light emission stage T21 in different modes, thereby helping improve the display uniformity of the display panel in different modes.

It is to be understood that the duration of the bias maintaining stage Tc11 in the first mode N1 is different from the duration of the bias maintaining stage Tc11 in the second mode N2. In this case, when the length of the third time period Tg1 in the first mode N1 is the same as the third time period Tg2 in the second mode N2, the duration between the start moment of the data write stage Ta and the start moment of the first light emission stage T21 in the first mode N1 may be different from the duration between the start moment of the data write stage Ta and the start moment of the first light emission stage T21 in the second mode N2. In this case, a bias adjustment may be performed for the drive transistor M1 on this basis to meet the requirements of display uniformity.

Optionally, with continued reference to FIGS. 2 and 10 or FIGS. 4 and 11, when the first non-light emission stage T11 includes the data write stage Ta, and when in the first non-light emission stage T11, a first time period Te is from the start moment of the data write stage Ta to the start moment of the first light emission stage T21, the length of the first time period Te1 in the first mode N1 is different from the length of the first time period Te2 in the second mode N2. That is, the duration in which the data signal Vdata is maintained in the gate of the drive transistor M1 in the first mode N1 is different from the duration in which the data signal Vdata is maintained in the gate of the drive transistor M1 in the second mode N2.

Specifically, when entering the data write stage Ta, the data signal Vdata may be supplied to the source of the drive transistor M1 through the data write module 12, transmitted to the drain of the drive transistor M1 through the drive transistor M1, and transmitted to the gate of the drive transistor M1 through the compensation module 13 so that the voltage of the source of the drive transistor M1, the voltage of the drain of the drive transistor M1, and the voltage of the gate of the drive transistor M1 each begin to approach the voltage of the data signal Vdata. In this case, the data signal Vdata supplied to the source of the drive transistor M1, the drain of the drive transistor M1, and the gate of the drive transistor M1 may be used for performing a bias adjustment for the drive transistor M1. Moreover, because the brightness of the display panel in the first mode N1 is different from the brightness of the display panel in the second mode N2, different data signals Vdata are supplied to the drive transistor M1 in the first mode N1 and in the second mode N2. Accordingly, a difference exists between the degree of the bias adjustment to the drive transistor M1 by using the data signal Vdata supplied to the drive transistor M1 in the first mode and the bias adjustment to the drive transistor M1 by using the data signal Vdata supplied to the drive transistor M1 in the second mode. In this case, the first time period Te1 in the first mode N1 may be different from the first time period Te2 in the second mode N2. That is, the duration in which the data signal is in the gate of the drive transistor M1 in the first mode is different from the duration in which the data signal is in the gate of the drive transistor M1 in the second mode so that the drive transistor M1 has different bias degrees in different modes due to different durations of bias adjustments by using the data signals. Therefore, the bias generated by different signals written to the gate of the drive transistor M1 can be balanced so that when entering the first light emission stage T21 in different modes, the drive transistor M1 can maintain a consistent bias state, thereby improving the display uniformity of the display panel in different modes.

It is to be understood that the duration of the first time period in the first mode is set to be different from the duration of the first time period in the second mode, so that the bias caused by different data signals can be balanced. On the premise that the bias caused by different data signals is balanced, the display brightness of the display panel in the first mode, the display brightness of the display panel in the second mode, the duration of the first time period in the first mode, and the duration of the first time period in the second mode are not specifically limited in embodiments of the present disclosure.

In an optional embodiment, with continued reference to FIGS. 2 and 10 or FIGS. 4 and 11, when the display brightness of the display panel in the first mode N1 is greater than the display brightness of the display panel in the second mode N1, the length of the first time period Te1 in the first mode N1 is t30, and the length of the first time period Te2 in the second mode N2 is t40. In this case, t30>t40. That is, the duration of the bias adjustment to the drive transistor M1 by using the data signal in the first mode N1 is relatively long. The duration of the bias adjustment to the drive transistor M1 by using the data signal Vdata in the second mode N2 is relatively short.

Specifically, by way of example, the drive transistor M1 is a PMOS-type transistor. In the case where the brightness levels of the light-emitting element 200 are all Q, the voltage V1 of the data signal Vdata in the first mode N1 is smaller than the voltage V2 of the data signal Vdata in the second mode N2. Accordingly, in the first mode N1, the ion polarity in the drive transistor M1 is to a relatively small degree due to the data signal Vdata supplied to the drive transistor M1; and in the second mode N2, the ion polarity in the drive transistor M1 is to a relatively large degree due to the data signal Vdata supplied to the drive transistor M1. In this case, the length of the first time period Te1 in the first mode N1 is relatively great so that the bias time of the drive transistor M1 is relatively long under the action of the data signal Vdata. The length of the first time period Te2 in the second mode N2 is relatively small so that the bias time of the drive transistor M1 is relatively short under the action of the data signal Vdata. Accordingly, the bias of the drive transistor M1 to different degrees due to different data signals Vdata supplied to the drive transistor M1 in the first mode and the second mode is balanced. Therefore, when entering the first light emission stage T21 in different modes, the drive transistor M1 can maintain a consistent bias condition, thereby helping improve the display uniformity of the display panel in different modes.

Optionally, with continued reference to FIGS. 2 and 10 or FIGS. 4 and 11, a second time period Tf is from the start moment of the first non-light emission stage T11 to the start moment of the data write stage Ta. The length of the second time period Tf1 in the first mode N1 is t31. The length of the second time period Tf2 in the second mode is t32. t31<t41.

Specifically, the length t31 of the second time period Tf1 in the first mode N1 is smaller than the length t32 of the second time period Tf2 in the second mode. Therefore, after the first non-light emission stage T11 in the first mode N1 is entered, the data write stage Ta can be entered in a relatively short period of time so that the data signal Vdata is supplied to the drive transistor M1. After the first non-light emission stage T11 in the second mode N2 is entered, the data write stage Ta is entered after a relatively long period of time so that the data signal Vdata is supplied to the drive transistor M1. Moreover, after the data signal Vdata is supplied to the drive transistor M1, before the first light emission stage T21 is entered, the data signal Vdata can be continuously maintained in the drive transistor M1 so that the data signal Vdata can be used for performing a bias adjustment for the drive transistor M1. That is, in the first time period Te, the data signal Vdata is used for performing a bias adjustment for the drive transistor M1. In this case, t31<t41 so that t30>t40. That is, it guarantees that the duration of the first time period in the first mode is greater than the duration of the first time period in the second mode, meeting the bias adjustment requirements of the drive transistor M1 in different modes.

In an optional embodiment, when the length t30 of the first time period Te1 in the first mode N1 is greater than the length t40 of the first time period Te2 in the second mode N2, and when the length t31 of the second time period Tf1 in the first mode N1 is smaller than the length t32 of the second time period Tf2 in the second mode, t30+t31=t40+t41. In this case, the duration between the start moment of the first non-light emission stage T11 and the start moment of the first light emission stage T21 in the first mode N1 is the same as the duration between the start moment of the first non-light emission stage T11 and the start moment of the first light emission stage T21 in the second mode N2 so that the length of the first non-light emission stage T11 in the first mode N1 is the same as the length of the first non-light emission stage T11 in the second mode N2. Therefore, the time of the light emission stage T2 in different modes can be long enough, thereby helping improve the entire display brightness of the display panel and improve the display effect of the display panel.

Figure 12:
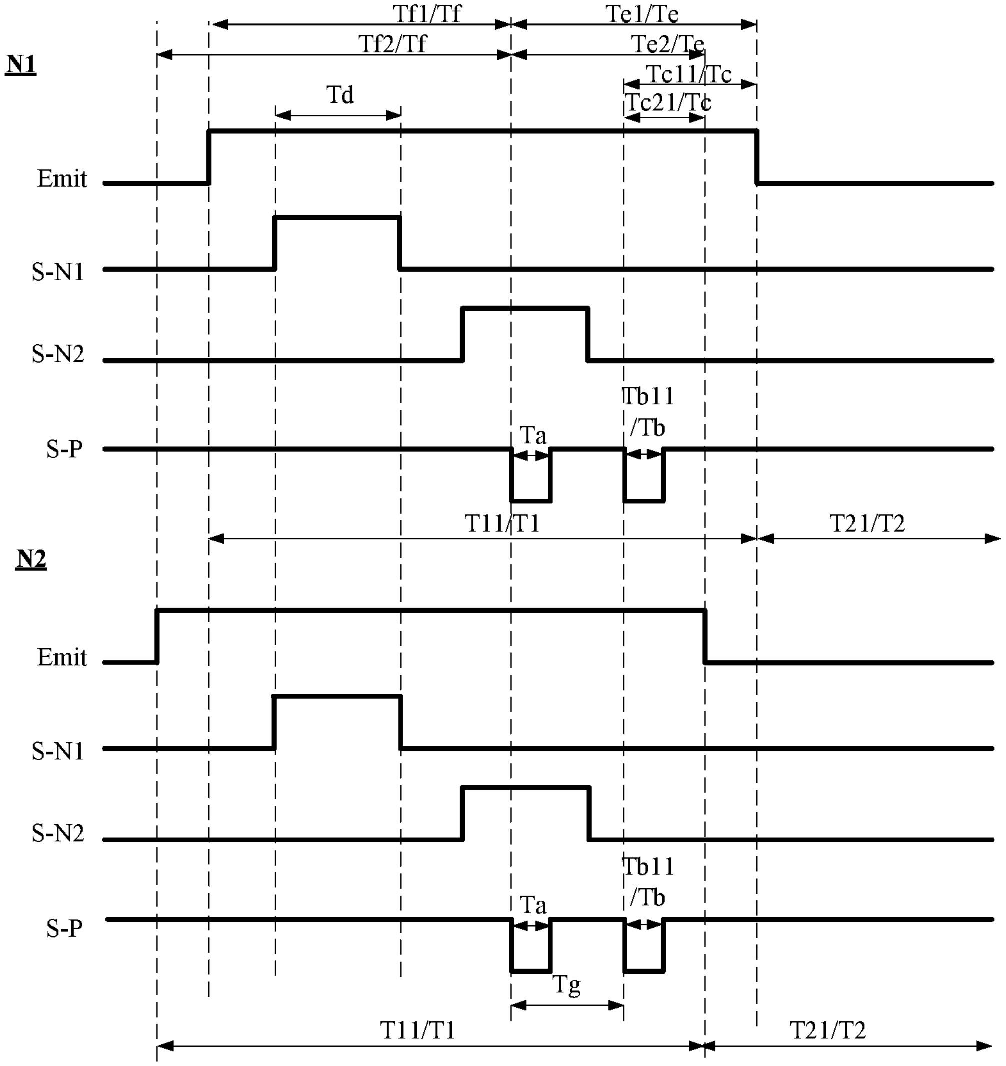
FIG. 12 is another drive timing diagram of a pixel circuit in a display panel according to an embodiment of the present disclosure.
Figure 13:
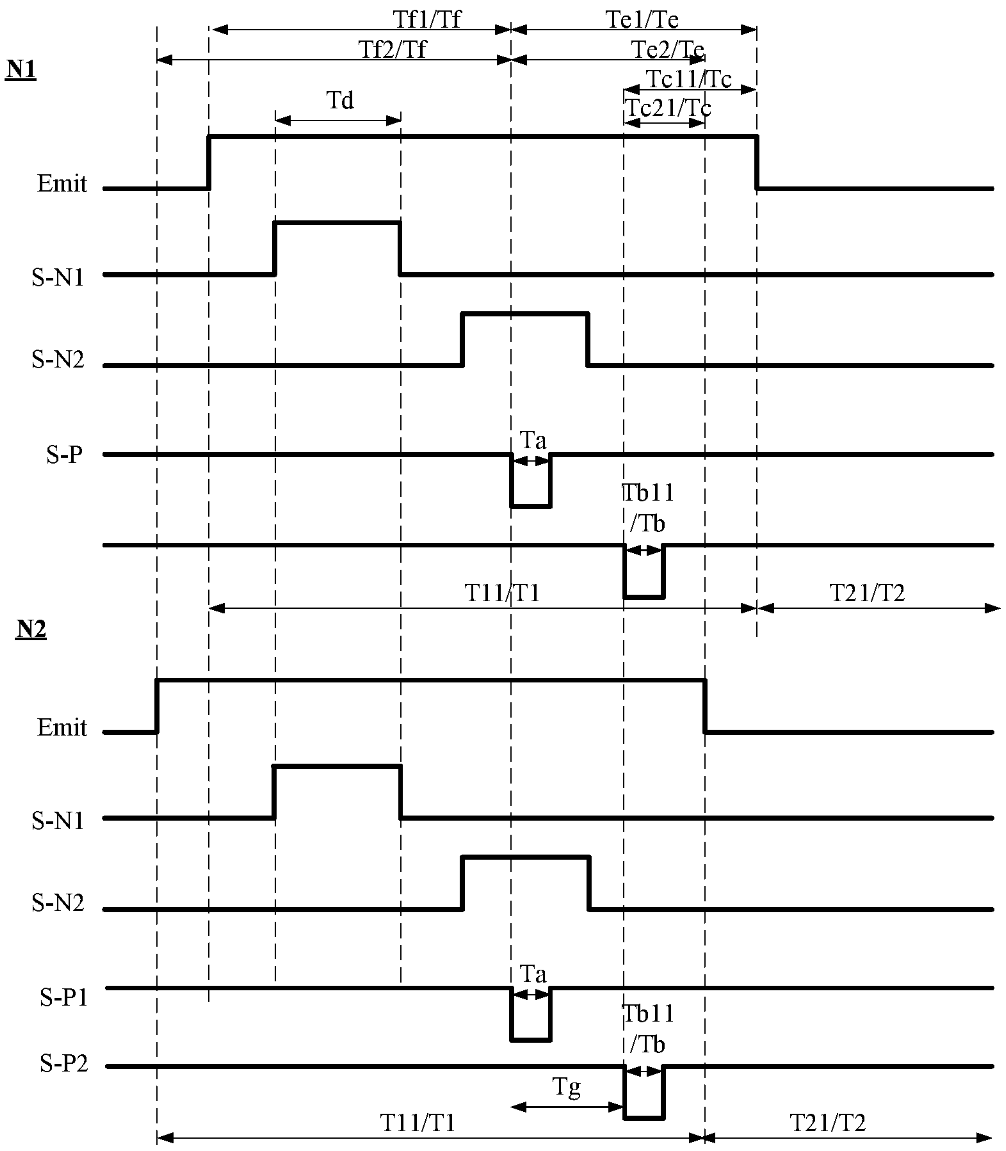
FIG. 13 is another drive timing diagram of a pixel circuit in a display panel according to an embodiment of the present disclosure.

When t30+t31=t40+t41, and when the length of the first time period Te in the first mode N1 is different from the length of the first time period Te in the second mode N2, the data write stage Ta in the second mode N2 may be translated compared with the data write stage Ta in the first mode N1. Alternatively, as shown in FIG. 12 or 13, when t30+t31=t40+t41, and when the length of the first time period Te in the first mode N1 is different from the length of the first time period Te in the second mode N2, the non-light emission stage T11 in the second mode N2 may be translated compared with the non-light emission stage T11 in the first mode N1. On the premise that the core invention points of embodiments of the present disclosure can be implemented, the specific timing configuration mode is not limited in embodiments of the present disclosure.

Figure 14:
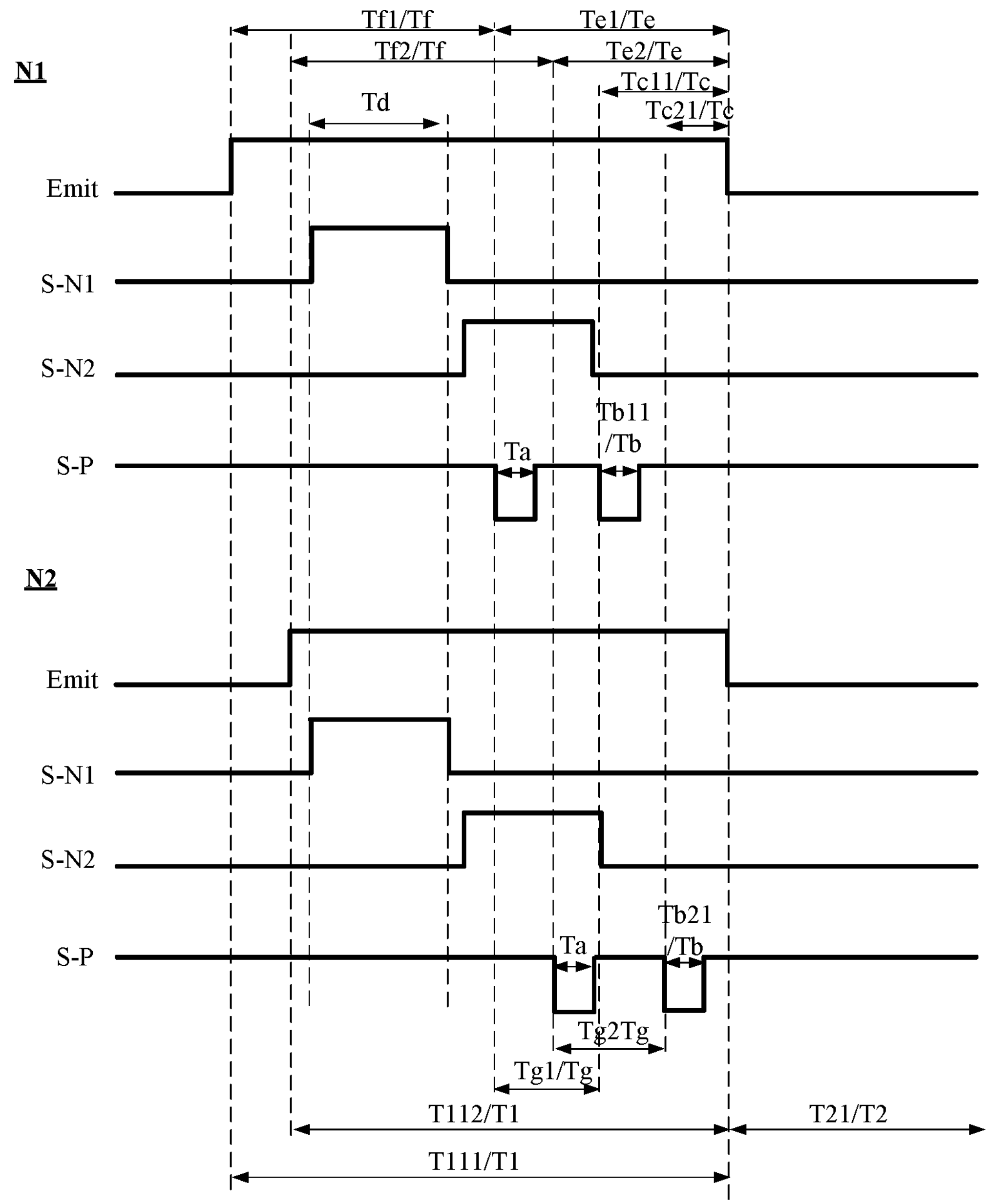
FIG. 14 is another drive timing diagram of a pixel circuit in a display panel according to an embodiment of the present disclosure.
Figure 15:
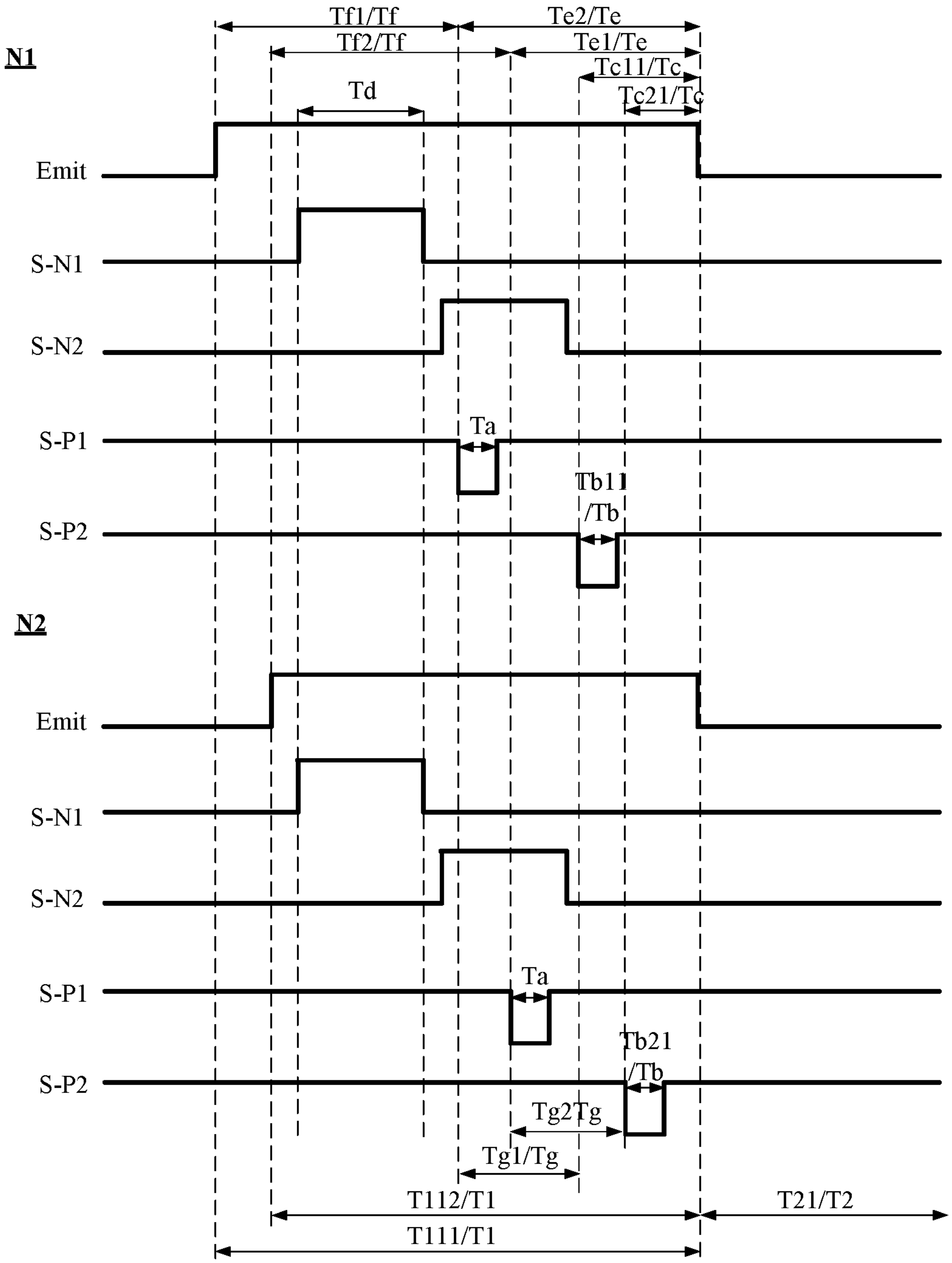
FIG. 15 is another drive timing diagram of a pixel circuit in a display panel according to an embodiment of the present disclosure.

In other optional embodiments, as shown in FIG. 14 or 15, when the length of the first time period Te in the first mode N1 is different from the length of the first time period Te in the second mode N2, the duration of the non-light emission stage T111 in the first mode N1 may be different from the duration of the non-light emission stage T112 in the second mode N2 so as to further adjust the display brightness of the display panel, enabling the display panel to have a finer brightness adjustment mode.

Optionally, the working modes of the display panel may further a third mode and a fourth mode. The display brightness of the display panel in the first mode and the display brightness of the display panel in the second mode are each greater than the display brightness of the display panel in the third mode and the display brightness of the display panel in the fourth mode. The display brightness of the display panel in the third mode is different from the display brightness of the display panel in the fourth mode. The length of the first non-light emission stage in the third mode is different from the length of the first non-light emission stage in the fourth mode.

It is to be understood that the grayscales of the light-emitting element and the brightness have different mapping relationships in different modes so that the display panel has different brightness in different modes. Alternatively, durations of the light emission stage in different modes may be set to different values so that human eyes have different integral values for the brightness, implementing the adjustment of the display brightness in different modes. Moreover, the duration of one frame stage (for example, data write frame or retention frame) is usually a fixed value. That is, the total duration of one light emission stage and one non-light emission stage is a fixed value. In this case, adjusting the duration of a light emission stage may be equivalent to adjusting the duration of a non-light emission stage.

In this case, when the display brightness of the display panel is in a relatively low brightness range, durations of the non-light emission stage in different modes may be adjusted to implement a brightness adjustment for the display panel so that the non-light emission stage of the display panel has different durations in the third mode and fourth mode with relatively low brightness. In this case, the correspondence between grayscales and data signals in the third mode is the same as the correspondence between grayscales and data signals in the fourth mode.

Optionally, the display brightness in the third mode and the display brightness in the fourth mode are relatively low. Moreover, the correspondence between grayscales and data signals in the third mode is the same as the correspondence between grayscales and data signals in the fourth mode. Therefore, the bias condition caused by a data signal in the third mode is similar to the bias condition caused by a data signal in the fourth mode. In this case, the length of the bias maintaining stage in the third mode may be set to be equal to the length of the bias maintaining stage in the fourth mode. Therefore, it is unnecessary to change the length of the bias maintaining stage in each mode within a relatively low brightness range, helping simplify the driving mode of the display panel.

In another optional embodiment, the working modes of the display panel may further include a fifth mode and a sixth mode. The display brightness of the display panel in the first mode and the display brightness of the display panel in the second mode are each less than the display brightness of the display panel in the fifth mode and the display brightness of the display panel in the sixth mode. The display brightness of the display panel in the fifth mode is different from the display brightness of the display panel in the sixth mode. The length of the first non-light emission stage in the fifth mode is the same as the length of the first non-light emission stage in the sixth mode. The length of the bias maintaining stage in the fifth mode is equal to the length of the bias maintaining stage in the sixth mode.

Specifically, the brightness of the display panel in the fifth mode and the brightness of the display panel in the sixth mode are greater than the brightness of the display panel in the first mode and the brightness of the display panel in the second mode, so that the brightness of the display panel in the fifth mode and the brightness of the display panel in the sixth mode are each within a higher brightness range within which the brightness adjustment mode may be the same as the adjustment mode within a brightness range to which the first mode and the second mode belongs. That is, the correspondence between grayscales and data signals in the fifth mode is different from the correspondence between grayscales and data signals in the sixth mode. The duration of the non-light emission stage in the fifth mode may be the same as the duration of the non-light emission stage in the sixth mode. Moreover, the display brightness of the display panel in the fifth mode and the display brightness of the display panel in the sixth mode are relatively great so that the display brightness of the display panel, when slightly fluctuating within the brightness range, is not easily perceived by human eyes. Therefore, the length of the bias maintaining stage in the fifth mode may be the same as the length of the bias maintaining stage in the sixth mode. Therefore, it is unnecessary to change the length of the bias maintaining stage in each mode within a higher brightness range, helping simplify the driving mode of the display panel.

Figure 16:
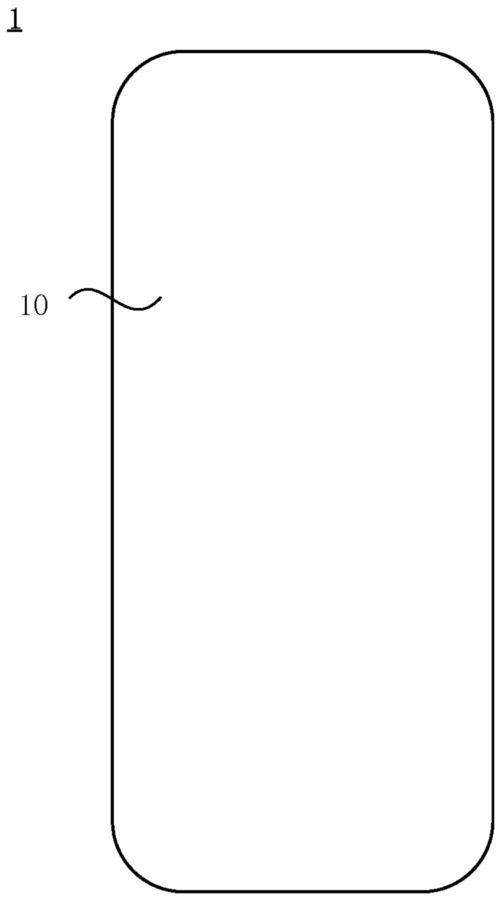
FIG. 16 is a diagram illustrating the structure of a display device according to an embodiment of the present disclosure.

Based on the same inventive concept, an embodiment of the present disclosure further provides a display device. FIG. 16 is a diagram illustrating the structure of a display device according to an embodiment of the present disclosure. The display device includes the display panel provided in any preceding embodiment. Exemplarily, referring to FIG. 16, the display device 1 includes the display panel 10. Therefore, the display device also has the beneficial effects of the display panel described in the preceding embodiments. For the same details, reference may be made to the description of the preceding display panel, which is not repeated hereinafter.

The display device 1 provided in the embodiment of the present disclosure may be a phone shown in FIG. 16, or may be any electronic product with a display function, including and not limited to: a television, a laptop, a desktop display, a tablet computer, a digital camera, a smart bracelet, smart glasses, an in-vehicle display, industry-controlling equipment, a medical display, a touch interactive terminal and the like, which is not specifically limited in the embodiment of the present disclosure.

It is to be noted that the preceding are only preferred embodiments of the present disclosure and technical principles used therein. It is to be understood by those skilled in the art that the present disclosure is not limited to the embodiments described herein. For those skilled in the art, various apparent changes, readjustments, and substitutions can be made without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A display panel, comprising a pixel circuit and a light-emitting element, wherein the pixel circuit comprises a drive module and a data write module, and the drive module comprises a drive transistor;

a working process of the pixel circuit comprises a data write stage and a bias stage, the data write module is configured to supply a data signal in the data write stage, and the data write module is configured to supply a bias signal in the bias stage;

the drive transistor is configured to selectively supply a drive current to the light-emitting element, and the working process of the pixel circuit comprises a first light emission stage and a first non-light emission stage;

in the first non-light emission stage, a bias maintaining stage is from a start moment of the bias stage to a start moment of the first light emission stage;

working modes of the display panel comprise a first mode and a second mode, and display brightness of the display panel in the first mode is different from display brightness of the display panel in the second mode; and a length of the bias maintaining stage in the first mode is different from a length of the bias maintaining stage in the second mode.

2. The display panel according to claim 1, wherein the display brightness of the display panel in the first mode is greater than the display brightness of the display panel in the second mode; and the length of the bias maintaining stage in the first mode is t10, and the length of the bias maintaining stage in the second mode is t20, wherein t10>t20.

3. The display panel according to claim 1, wherein the display brightness of the display panel in the first mode is greater than the display brightness of the display panel in the second mode;

one-frame time of the display panel comprises a data write frame; and a length of the bias maintaining stage in the data write frame in the first mode is t11, and a length of the bias maintaining stage in the data write frame in the second mode is t21, wherein t11>t21.

4. The display panel according to claim 3, where the one-frame time of the display panel further comprises at least one retention frame; and a length of the bias maintaining stage in a retention frame among the at least one retention frame in the first mode is t12, and a length of the bias maintaining stage in the retention frame in the second mode is t22, wherein t12>t22.

5. The display panel according to claim 4, wherein at least one of the following configurations is met: t11/t12, or t21/t22; or at least one of the following configurations is met: t11=t12, or t21=t22.

6. The display panel according to claim 4, wherein a voltage of the bias signal in the retention frame is a fixed value, and/or a voltage of the bias signal in the data write frame is a fixed value;

wherein the voltage of the bias signal in the retention frame is different from the voltage of the bias signal in the data write frame.

7. The display panel according to claim 4, wherein a voltage of the bias signal in the data write frame in the first mode is V1, and a voltage of the bias signal in the data write frame in the second mode is V2, wherein V2+V1; and/or a voltage of the retention frame in the first mode is V3, and a voltage of the retention frame in the second mode is V4, wherein V4+V3.

8. The display panel according to claim 1, wherein the data write module comprises a first transistor and a second transistor;

a gate of the first transistor is configured to receive a first scan signal, a first electrode of the first transistor is configured to receive the data signal, a second electrode of the first transistor is electrically connected to the drive module, and the first scan signal is configured to control the first transistor to turn on in the data write stage; and a gate of the second transistor is configured to receive a second scan signal, a first electrode of the second transistor is configured to receive the bias signal, a second electrode of the second transistor is electrically connected to the drive module, and the second scan signal is configured to control the second transistor to turn on in the bias stage.

9. The display panel according to claim 1, wherein the display panel further comprises a first signal line, wherein the data write module comprises a write transistor, a gate of the write transistor is configured to receive a scan signal, a first electrode of the write transistor is electrically connected to the first signal line, and a second electrode of the write transistor is electrically connected to the drive module;

in the data write stage, the scan signal is configured to control the write transistor to turn on, and the first signal line is configured to transmit the data signal; and in the bias stage, the scan signal is configured to control the write transistor to turn on, and the first signal line is configured to transmit the bias signal.

10. The display panel according to claim 1, wherein the first non-light emission stage comprises the data write stage; and in the first non-light emission stage, a first time period is from a start moment of the data write stage to the start moment of the first light emission stage; and a length of the first time period in the first mode is different from a length of the first time period in the second mode.

11. The display panel according to claim 10, wherein the display brightness of the display panel in the first mode is greater than the display brightness of the display panel in the second mode; and the length of the first time period in the first mode is t30, and the length of the first time period in the second mode is t40, wherein t30 >t40.

12. The display panel according to claim 11, wherein a second time period is from a start moment of the first non-light emission stage to the start moment of the data write stage; and a length of the second time period in the first mode is t31, and a length of the second time period in the second mode is t32, wherein t31<t41;

wherein t30+t31=t40+t41.

13. The display panel according to claim 1, wherein the first non-light emission stage comprises the data write stage; and in the first non-light emission stage, a third time period is from a start moment of the data write stage to the start moment of the bias stage; and a length of the third time period in the first mode is different from a length of the third time period in the second mode.

14. The display panel according to claim 13, wherein the display brightness of the display panel in the first mode is greater than the display brightness of the display panel in the second mode; and the length of the third time period in the first mode is t32, and the length of the third time period in the second mode is t42, wherein t32<t42;

wherein the length of the bias maintaining stage in the first mode is t10, and the length of the bias maintaining stage in the second mode is t20, wherein t10+t32=t20+t42.

15. The display panel according to claim 1, wherein the first non-light emission stage comprises the data write stage; and in the first non-light emission stage, a third time period is from a start moment of the data write stage to the start moment of the bias stage; and a length of the third time period in the first mode is t30, and a length of the third time period in the second mode is t40, wherein t30=t40.

16. The display panel according to claim 1, wherein a length of the first non-light emission stage in the first mode is same as a length of the first non-light emission stage in the second mode.

17. The display panel according to claim 16, wherein the working modes of the display panel further comprise a third mode and a fourth mode, the display brightness of the display panel in the first mode and the display brightness of the display panel in the second mode are each greater than display brightness of the display panel in the third mode and display brightness of the display panel in the fourth mode, and the display brightness of the display panel in the third mode is different from the display brightness of the display panel in the fourth mode; and a length of the first non-light emission stage in the third mode is different from a length of the first non-light emission stage in the fourth mode.

18. The display panel according to claim 17, wherein a length of the bias maintaining stage in the third mode is equal to a length of the bias maintaining stage in the fourth mode.

19. The display panel according to claim 16, wherein the working modes of the display panel further comprise a fifth mode and a sixth mode, the display brightness of the display panel in the first mode and the display brightness of the display panel in the second mode are each less than display brightness of the display panel in the fifth mode and display brightness of the display panel in the sixth mode, and the display brightness of the display panel in the fifth mode is different from the display brightness of the display panel in the sixth mode; and a length of the first non-light emission stage in the fifth mode is same as a length of the first non-light emission stage in the sixth mode, and a length of the bias maintaining stage in the fifth mode is equal to a length of the bias maintaining stage in the sixth mode.

20. A display device, comprising a display panel, wherein the display panel comprises a pixel circuit and a light-emitting element, wherein the pixel circuit comprises a drive module and a data write module, and the drive module comprises a drive transistor;

a working process of the pixel circuit comprises a data write stage and a bias stage, the data write module is configured to supply a data signal in the data write stage, and the data write module is configured to supply a bias signal in the bias stage;

the drive transistor is configured to selectively supply a drive current to the light-emitting element, and the working process of the pixel circuit comprises a first light emission stage and a first non-light emission stage;

in the first non-light emission stage, a bias maintaining stage is from a start moment of the bias stage to a start moment of the first light emission stage;

working modes of the display panel comprise a first mode and a second mode, and display brightness of the display panel in the first mode is different from display brightness of the display panel in the second mode; and a length of the bias maintaining stage in the first mode is different from a length of the bias maintaining stage in the second mode.

* * * * *